United States Patent
Okamoto et al.

(10) Patent No.: US 6,320,275 B1
(45) Date of Patent: Nov. 20, 2001

(54) POWER-FEED CONTROL APPARATUS PROVIDED IN A VEHICLE

(75) Inventors: Kaneyuki Okamoto, Hitachinaka; Tatsuya Yoshida, Urizura-machi; Hiroyuki Saito, Hitachinaka; Shinichi Sakamoto, Mito; Ichiro Osaka, Kawasaki; Mitsuhiko Watanabe, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/342,062

(22) Filed: Jun. 29, 1999

(30) Foreign Application Priority Data

Jul. 3, 1998 (JP) .................................................. 10-188541

(51) Int. Cl.[7] ..................................................... B60L 1/00
(52) U.S. Cl. ............................................. 307/10.1; 361/31
(58) Field of Search .................................... 307/9.1, 10.1; 361/31, 93, 94

(56) References Cited

U.S. PATENT DOCUMENTS

| | | | | |
|---|---|---|---|---|
| 4,532,567 | * | 7/1985 | Kade | 361/31 |
| 4,639,609 | * | 1/1987 | Floyd et al. | 301/10 R |
| 4,672,278 | * | 6/1987 | Ingraham et al. | 318/283 |
| 5,231,309 | | 7/1993 | Soma et al. | |
| 5,559,375 | * | 9/1996 | Jo et al. | 307/10.1 |
| 5,666,044 | | 9/1997 | Tuozzolo | |
| 5,773,945 | | 6/1998 | Kim et al. | |

FOREIGN PATENT DOCUMENTS

| | | |
|---|---|---|
| 61-261920 | 11/1986 | (JP) . |
| 62-11916 | 1/1987 | (JP) . |
| 62-143450 | 6/1987 | (JP) . |
| 63-87128 | 4/1988 | (JP) . |
| 10-145205 | 5/1998 | (JP) . |
| WO 96/26570 | 8/1996 | (WO) . |

* cited by examiner

*Primary Examiner*—Josie Ballato
*Assistant Examiner*—Sharon Polk
(74) *Attorney, Agent, or Firm*—Crowell & Moring LLP

(57) ABSTRACT

A power-feed control apparatus for a vehicle in which electrical loads are arranged in the vehicle includes a power source provided in a vehicle; at least one power semiconductor element, the power semiconductors controlling power-feed to the electrical load; a control unit for controlling the power semiconductor element; an anomaly detection circuit for monitoring operations of the power semiconductor element and determining whether or not an anomaly is occurring in a circuit including the power semiconductor element and the electrical load; and a switching circuit for switching a threshold level between a level for an anomaly detection in a starting period of the load and that in a steady state of the load connected to the power semiconductor element; wherein if an anomaly is detected in the circuit by the anomaly detection circuit, the control unit turns off the power semiconductor so as to interrupt power-feed to the electrical load.

15 Claims, 24 Drawing Sheets

POWER-FEED CONTROL APPARATUS PROVIDED IN A VEHICLE

BACKGROUND OF THE INVENTION

The present invention relates to a power-feed control apparatus provided in a vehicle for controlling turn-on or off operations of electrical loads such as lamps, motors, and so on, using power semiconductor elements with a protection function to detect an anomaly in a circuit including each load and to interrupt the power-feed to the load in the circuit, and especially relates to a power-feed control apparatus suitable for a vehicle in which electrical loads are incorporated being controlled by a network system using a serial-transmission line.

In a general conventional method, a current flow fed to a load is detected, and if the current flow excessively increases, the current flow is interrupted. This method is implemented with MOS-FETs in techniques disclosed in Japanese Patent Application Laid-Opens Sho. 61-2611920, Sho. 62-11916, Sho. 62-143450, and Sho. 63-87128.

Furthermore, a technique disclosed in Japanese Patent Application Laid-Open Hei. 8-303018 permits a large starting current of a load such as a lamp, and interrupts a power-feed to a load if a short-circuit anomaly is detected at the load.

The above conventional techniques cannot deal with an anomalous consumption of energy in a battery due to a rare short-circuit (incomplete short-circuit) in a load, a locking anomaly of a motor due to an extraneous part inserted into the motor, an anomaly (generation of heat, inflammation, etc.) of the whole control system due to accumulation of heat slightly and continuously generated in power lines, and so on.

That is, if a power element with only one protection function based on current or temperature is designed so that the power element does not interrupt a power-feed to a load connected to the power element during the initial period with a large starting current flow, a comparatively small and anomalous change of current flowing in the power element in a steady-state cannot be detected and dealt with. Further, in a power-feed control system in which an anomaly in temperature or current is detected and the interruption of power-feed is performed for each load, the composition of the control system becomes complicated and expensive. In a method in which a current detection resistor is serially connected to a load, the power loss at the current detection resistor is large, which increases the waste heat generation.

SUMMARY OF THE INVENTION

The present invention has been achieved in consideration of the above-described problems, and is aimed at realizing a protective function for a power-feed control apparatus for a vehicle, which does not respond to a large starting current just after a load is turned on via a power element, and can sensitively detect an anomalous change of current flowing in the power element in a steady state, and is further aimed at cheaply providing a power-feed control apparatus with the above protective function, which can decrease power consumption.

In order to attain the above object, the present invention provides a means for switching a protective function between one for the starting period and one for the steady state of current flowing in a power element in a power-feed control apparatus. Further, the present invention provides another means for monitoring current flowing in the power element or the temperature of the power element roughly in the starting transient state and precisely in the steady state. Furthermore, the present invention provides a protective circuit for the initial period with a large transient current flow and another protective function for the period with a steady current flow, and uses the latter protective function in the steady state after the initial transient state has lapsed. Moreover, in another means provided by the present invention, the current fed to each power element is serially turned on and off, in which the time width for the turning-off of the power element is much shorter than that of the turning-on of the power element, and it is monitored whether or not the difference between two current flow levels at the turning-on state and the turning-off state of the power element is less than a predetermined reference value.

DETAILED DESCRIPTION OF THE EMBODIMENTS

Hereafter, details of the embodiments according to the present inventions will be explained with reference to the drawings.

Figure 29:
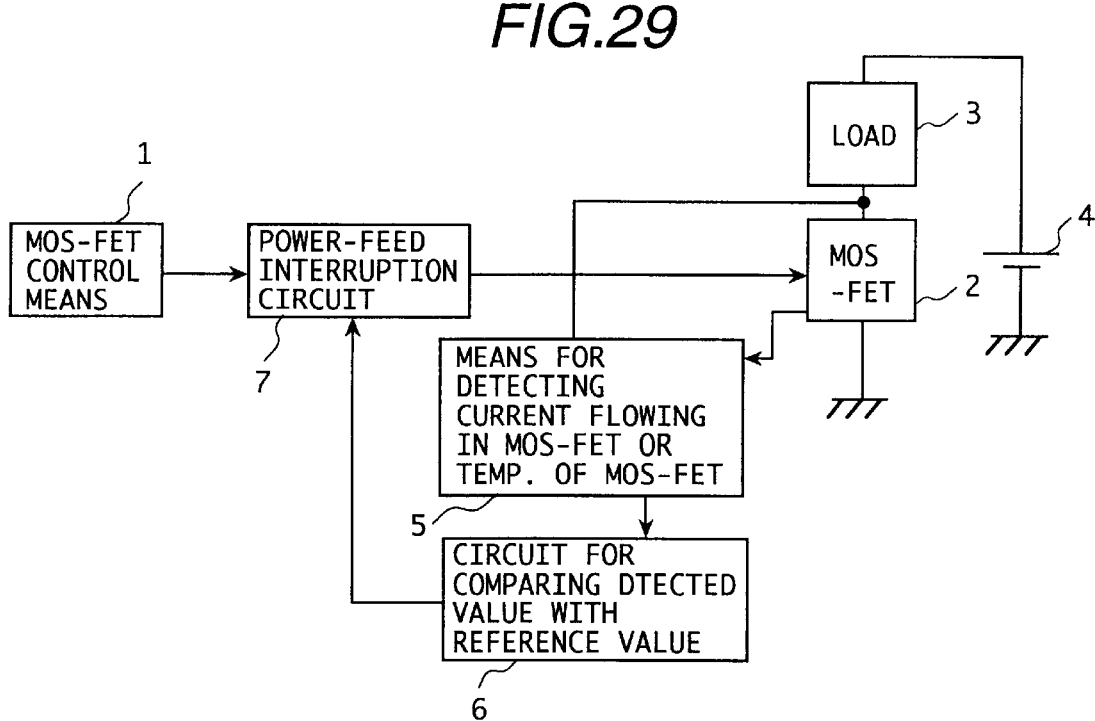
FIG. 29 is a schematic block diagram showing the composition of an conventional power-feed control apparatus.
Figure 30:
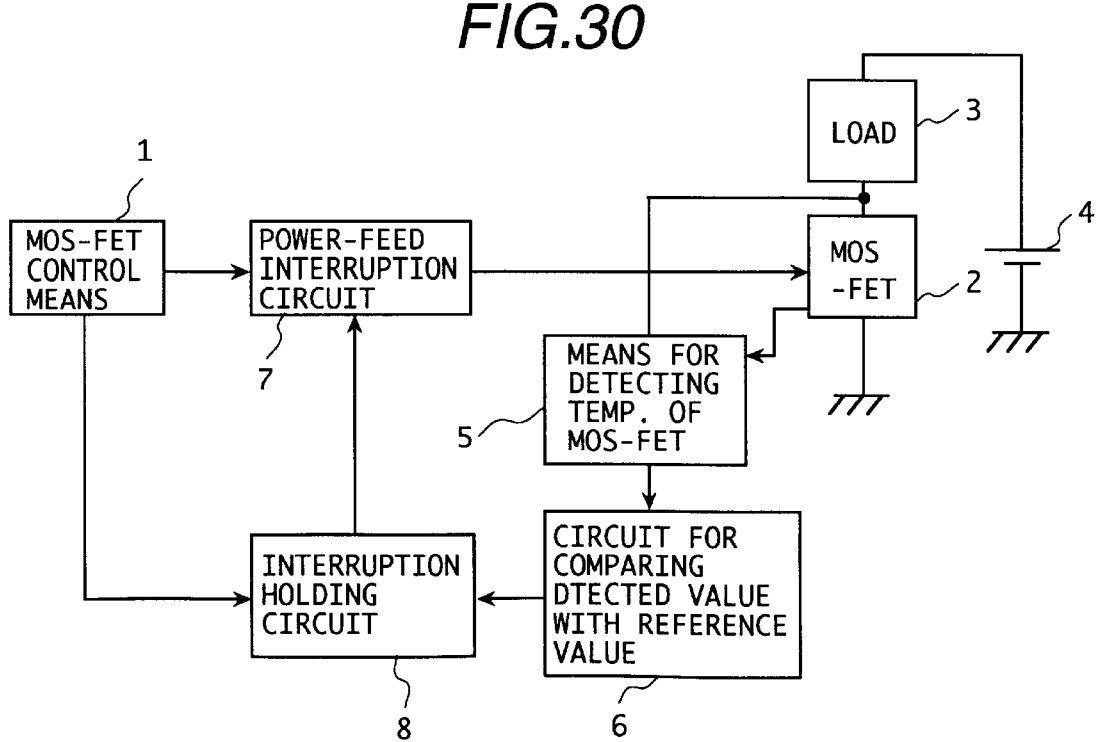
FIG. 30 is a schematic block diagram showing the composition of another conventional power-feed control apparatus.
Figure 31:
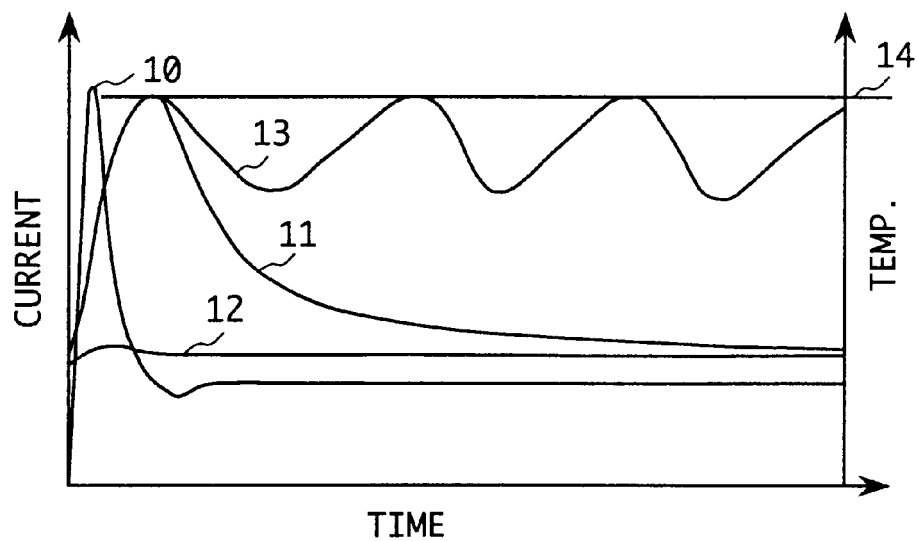
FIG. 31 shows graphs to explain operations of the conventional power-feed control apparatus shown in FIG. 29.
Figure 32:
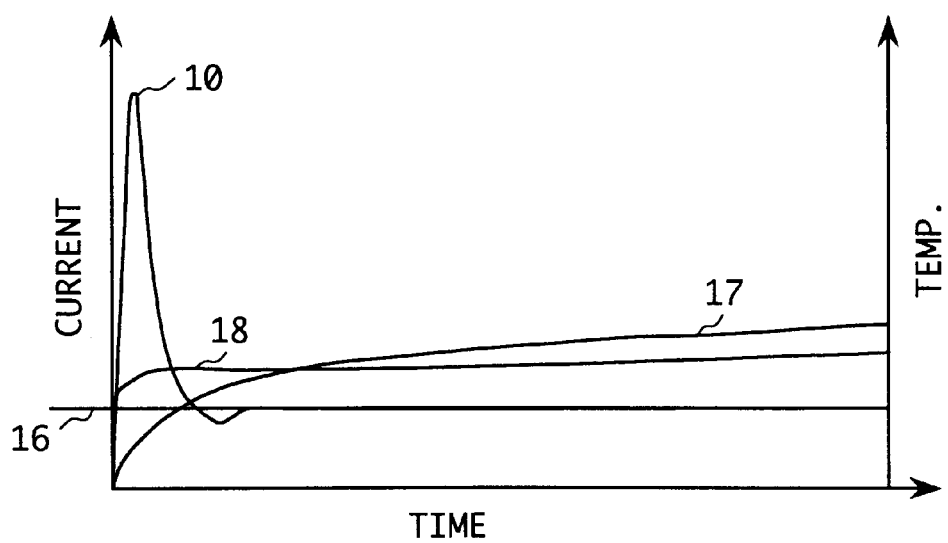
FIG. 32 shows graphs to explain operations of the conventional power-feed control apparatus shown in FIG. 30.

FIG. 29 and FIG. 30 are schematic block diagrams showing the respective compositions of examples of conventional power-feed control apparatuses, and FIG. 31 and FIG. 32 shows operations of the control apparatuses shown in FIG. 29 and FIG. 30. A power-feed control apparatus of the present invention has been devised by greatly improving the above-mentioned base conventional control apparatus. In the following, the conventional control apparatuses will be explained. The conventional power-feed control apparatus shown in FIG. 29 includes a MOS-FET control means 1, a switch means 2 using a MOS-FET, a battery 4, a detection means 5 for detecting current flow in the MOS-FET or temperature of the MOS-FET 2, a comparison circuit 6 for comparing the detected current or temperature with a predetermined reference value, and a power-feed interruption circuit 7. An electrical load 3 is connected to this control apparatus.

A means for detecting over-current fed to the load 3 is added to the power element (the MOS-FET 2), and the detected current value is compared with a reference level which is usually set as several times as large as a steady current level by the comparison circuit 6. Further, if the detected current value exceeds the reference value, the power-feed interruption circuit 7 interrupts the power-feed to the load 3.

The detection means 5 is composed of a sensor to detect a quantity which changes corresponding to a level of current flowing in the power element 2, such as a voltage drop at a resistor, a potential difference between both terminals of a diode, etc. Further, an amplifier is used if necessary. Also, a voltage comparing circuit such as a comparator is used as the comparison circuit. Further, the power-feed interruption circuit 7 is a circuit with a function to change the gate potential of the MOS-FET 2 to an off-potential.

This conventional power-feed control apparatus has some problems. For example, the starting large current flowing in a load such as a head lamp of a car may be interrupted by this control apparatus, which obstructs a smooth lighting operation of the head lamps. This problem is explained below with reference to FIG. 31. In this figure, the vertical axis indicates the current level and temperature, and the horizontal axis indicate time. Further, the graph 10 show changes of the current flowing in MOS-FET 2, and the graphs 11, 12, and 13 show changes of temperature of MOS-FET 2. Moreover, numeral 14 indicates the level of the reference value for the temperature of MOS-FET 2. When a lamp is lighted, current flowing in the lamp and the temperature of MOS-FET 2 usually change as shown by the graphs 10 and 12, respectively. That is, since the resistance of a filament (not shown in the figures) of the lamp is very small due to low temperature of the filament at the starting time of lighting the lamp, a large quantity of current rapidly flows as shown by the graph 10. After the rapid increase of the current, the resistance of the filament increases with the increasing temperature of the filament, and the current rapidly decreases. If the control apparatus automatically turns off MOS-FET 2 in respond to the rapid increase of the current flowing in MOS-FET 2, the lamp is not sufficiently heated and lighted. Accordingly, of the lamp is repeatedly turned on and off with a short period, similar to changes shown by the graph 13. The graph 13 shows changes of the temperature of MOS-FET 2, and the current changes with a much shorter period. That is, smooth lighting of the lamp is obstructed. Therefore, the rapid increase in the starting current flowing in the lamp is indispensable in the normal operation state. Thus, not the current but the temperature is monitored.

As mentioned above, the current rapidly increases at the starting time of the lamp as shown by the graph 10. On the other hand, the increase of the temperature is delayed and blunted in comparison with the increase of the current. Further, after the current reaches a steady state value, the temperature also reaches a steady state value. Therefore, the normal turning-on operation of the lamp is not obstructed. If the lamp or the motor falls in an anomalous state such as a rare short-circuit, a very large current flow continues, and the temperature of MOS-FET 2 also continues to increase. Thus, a power-feed interruption circuit to turn off MOS-FET 2 if the temperature exceeds a predetermined limit value which is shown by the threshold level 14 in FIG. 31, which is predetermined corresponding to a limit value of the current, is added to the apparatus shown in FIG. 29. However, if the interruption of the current is performed only by detecting whether or not the current exceeds the threshold level 14, the oscillation of the temperature near the threshold level 14 occurs. A technique to prevent the above oscillation by adding a switch circuit with a protective function for excessive-temperature is disclosed in Japanese Patent Application Laid-Open Hei. 8-303018, which was devised by the inventors of this application. The switch circuit with the protective function to excessive-temperature is briefly explained below with reference to FIG. 30 and FIG. 31.

In FIG. 30, numerals 5, 6, 7, and 8 indicate the means for detecting the temperature of MOS-FET 2, the comparison circuit 6 for comparing the detected temperature with a predetermined reference value, the power-feed interruption circuit, and an interruption-holding circuit. The interruption-holding circuit 8 is reset by a turning-off signal output from the MOS-FET control means 1, and is set to the holding operation by a signal output from the comparison circuit 6. When it is determined by the comparison circuit 6 that the temperature exceeds the threshold level 14, the comparison circuit 6 sets the interruption-holding circuit 8 to the holding operation, and compulsorily turns off the MOS-FET 2 by operating the power-feed interruption circuit 7. The above turning-off operation of MOS-FET 2 is forcibly performed even if the MOS-FET control means 1 outputs a turning-on signal to MOS-FET 2. Moreover, since the interruption-holding operation is continued until the MOS-FET control means 1 next outputs a turning-off signal to MOS-FET 2, the oscillation of the temperature can be prevented. Thus, after the temperature has reached the level 14, the temperature is controlled to decrease, which prevents a breakdown of an element such as a MOS-FET due to an anomalous high temperature, and heating or firing of a device in a power-feed path.

Figure 2:
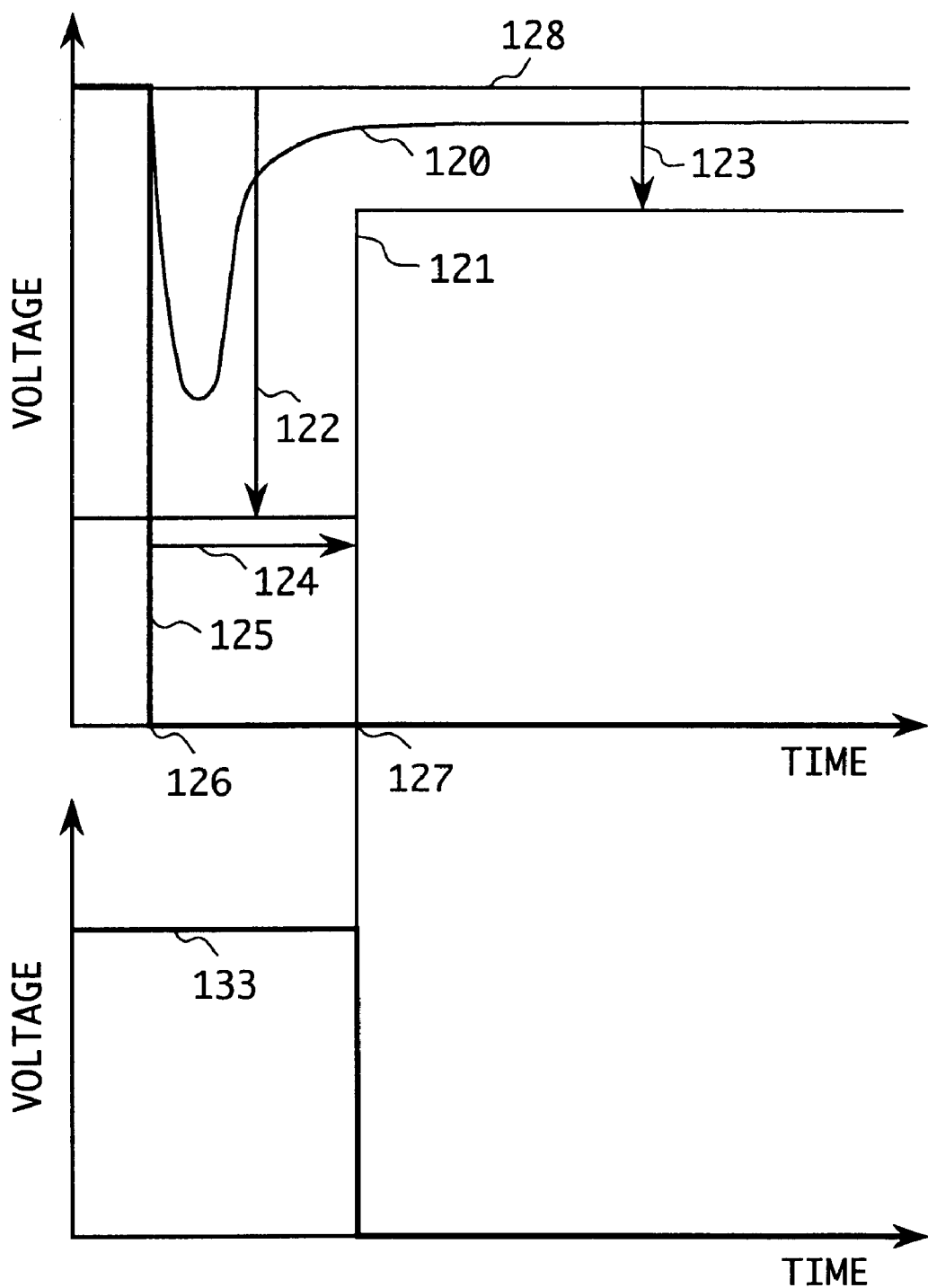
FIG. 2 shows graphs to explain operations of the power-feed control apparatus shown in FIG. 1.

I/O interfaces for controlling to the turn on/off of loads such as lamps, motors, etc., as shown in FIG. 2 in the specification of International Application Laid-Open WO 96/26570, are distributed and arranged at various places in a vehicle, and a protective switch circuit, such as that mentioned above, is needed for each of the I/O interfaces. Therefore, the protective switch circuit with the feature of the above-described conventional technique is applicable to each of the I/O interfaces shown in FIG. 2 in the specification of International Application Laid-Open WO 96/26570 to prevent an over-current flow in a load due to an anomaly of the load. Thus, by adopting the above-mentioned protection technique, it is possible to compose a power-feed system in which loads connected to each other with a transmission line are controlled via the transmission line, and power-feeding is automatically interrupted to a load where an anomaly such as a short-circuit is occurring. However, the above power system has the previously mentioned problems.

Figure 1:
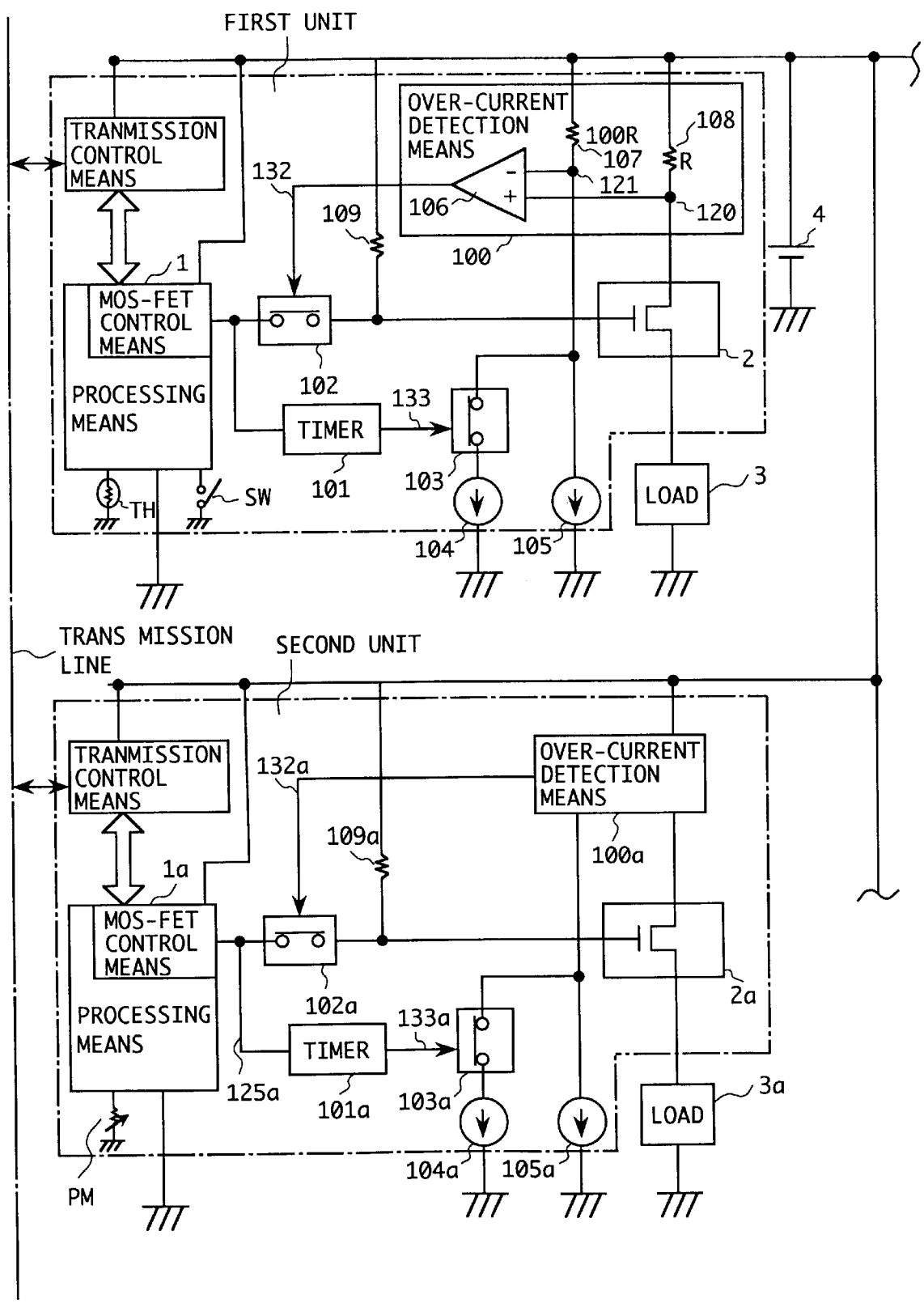
FIG. 1 is a schematic block diagram showing the composition of a power-feed control apparatus of an embodiment according to the present invention.

In the following, the present invention will be explained in detail. FIG. 1 is a schematic block diagram showing the composition of a power-feed control apparatus of an embodiment according to the present invention, in which each unit indicates a basic feature of the present invention. In International Application Laid-Open WO 96/26570, an I/O interface of each unit is connected to a transmission line. In this embodiment also, each of a plurality of control units includes a transmission control means, and each control unit transmits control information to each other as shown in FIG. 1. The transmitted information is used to generate a control signal for a load connected to the control unit which receives the transmitted information.

In the first unit, a processing unit including a MOS-FET control means 1 which detects signals output from a thirmistor TH, a signal from a switch SW, etc., can send the detected signals to other units via the transmission control means.

In the second unit also, a processing unit including a MOS-FET control means 1a detects, for example, a signal from a potentiometer, can send the detected signals to other units via the transmission control means.

Therefore, the first unit can generate a control signal for the load 3 with its processing means based on the signal from the potentiometer detected by the second unit, and it can control the MOS-FET 2 with the MOS-FET control means 1.

On the other hand, the second unit can generate a control signal for the load 3a with its processing means based on the signal from the thermistor TH, the signal from the switch SW, etc., which are detected by the first unit, and it can also control the MOS-FET 2a with the MOS-FET control means 1a.

A basic concept of the power-feed control apparatus according to the present invention is shown in FIG. 1. Each control unit includes an over-current detection means 100 (100a), a time measurement means such as a timer 101 (101a), ON/OFF switches 102 and 103 (102a and 103a), constant-current sources 104 and 105 (104a and 105a), a voltage-comparator 106, resistors 107 and 108, the resistance (=100R) of the resistor 107 being 100 times as large as that (=R) of the resistor 108, and a resistor 109. Operations of the power-feed control apparatus of this embodiment are explained by taking an example of operations of the first unit. FIG. 2 shows changes of voltage in each of the main parts in the first unit of the control apparatus of this embodiment. In this figure, the vertical and horizontal axes indicate voltage and time, respectively. Numerals 120–123, 125, 128, and 133 indicate voltage signals, and numeral 124 indicates time. Also, numerals 126 and 127 indicate points in time.

First, the value of a signal output from the MOS-FET control means 1 is changed from the voltage level 128 to zero level in respond to the signal 125 at the point 126 in time. Subsequently, MOS-FET 2, which has been turned off before the point 126 in time, begins to feed current to the load 3. Assuming that the load 3 is a lamp, since the temperature of a filament in the lamp is low just after the turning-on of the lamp, a large starting current flows in the filament. Afterward, since the resistance of the filament increases due to heating of the filament, the current flowing in the filament gradually decreases. Accordingly, an electrical signal indicating the voltage drop due to the resistance increase of the filament changes as shown by the signal 120 in FIG. 2. The resistor 107 causes the voltage drop according to the sum of current flows generated by the constant-current sources 104 and 105. In the initial period, the switch 103 is in an ON state, and the sum of current flows generated by the constant-current sources 104 and 105 flows in the resistor 107. To retrench the current flowing in the resistor 107, the resistance of the resistor 108 is set at a small value, and that of the resistor 107 is set at a large value. In this embodiment, the ratio of the later resistance to the former resistance is set at 100. If this power-feed control apparatus is designed so that the maximum value of the large starting current is 10 A, the resistance R of the resistor 108 is determined as follows assuming that the voltage level 128 and the voltage drop 122 are set at 12 V and 10 V, respectively.

$$R=10/10=1(\Omega)$$

Then, the resistance of the resistor 107 is 100 Ω. If the steady current flowing in the load 3 is 1 A, and a threshold value for detecting an anomaly is 3 A in the steady state after the time 124 has elapsed, the current generated by the constant-current source 105 is one hundredth of 3 A, that is, 30 mA, and the current generated by the constant-current source 104 is 70 mA. It is because the current of the constant-current source 104 should be 70 mA to satisfy the condition that the voltage drop 122 at the resistor 107 is 10 V and the current flowing in the resistor 107 is 100 mA. The time interval 124 is counted by the timer 101, and the timer 101 is triggered by the signal 125 which changes at the point 126 in time. As mentioned above, the current flowing in the resistor 107 is set at 100 mA before the point 127 in time, and at 30 mA after this point. The voltage comparator 106 compares the voltage 120 with the voltage 121, and generates a signal of the high voltage level as an output signal 132 if the voltage 120 is higher than the voltage 121. Otherwise, the comparator 106 generates a signal of the zero level voltage as the output signal 132. Further, the switch 102 turns to an ON state. Accordingly, in the normal state of the load 3, since the voltage 120 is always higher than the voltage 121, the output signal 132 is always the signal of the high voltage level, which maintains the switch 102 in the ON state.

Figure 3:
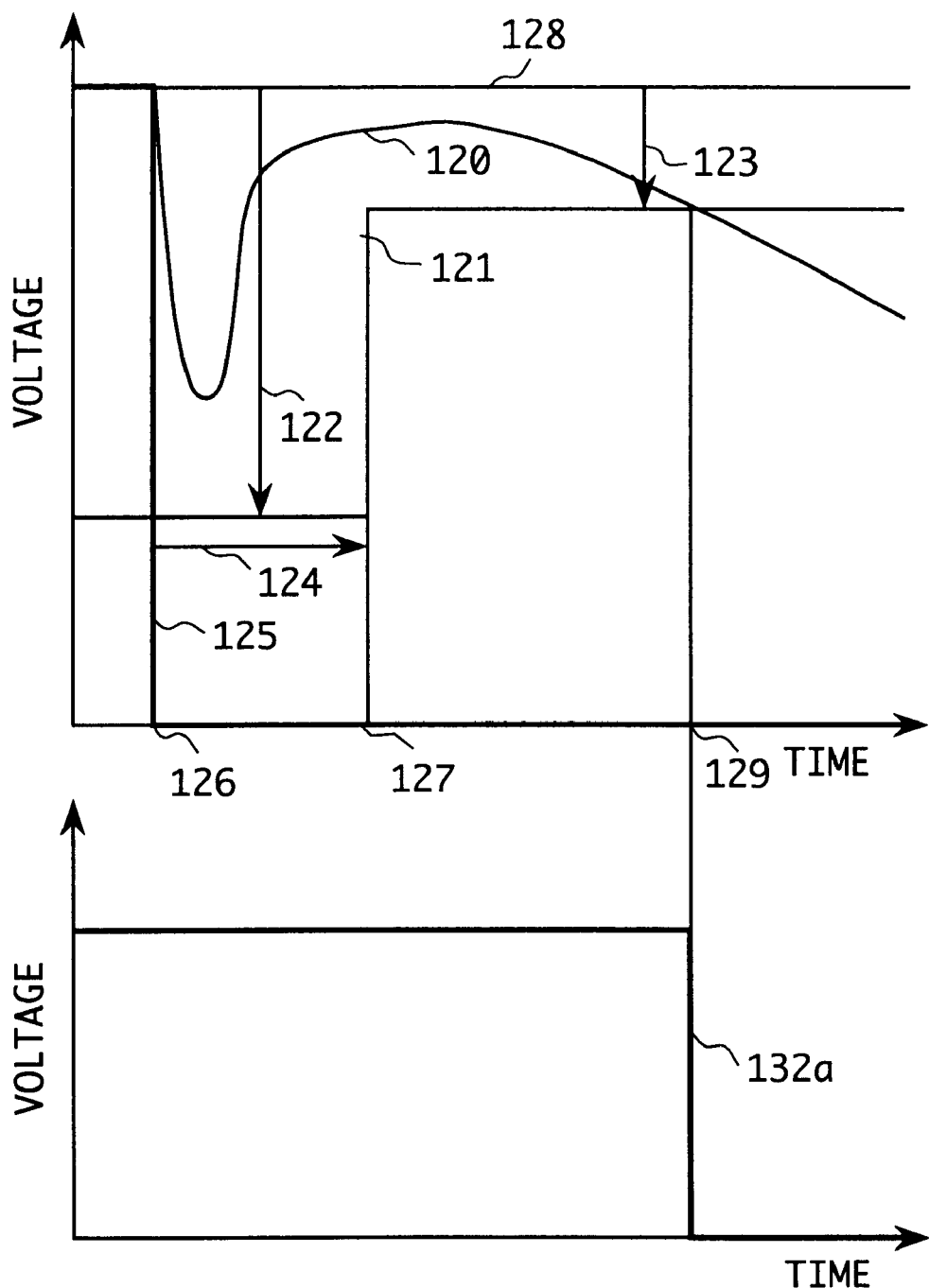
FIG. 3 shows graphs to explain operations of the power-feed control apparatus shown in FIG. 1 under another condition.
Figure 4:
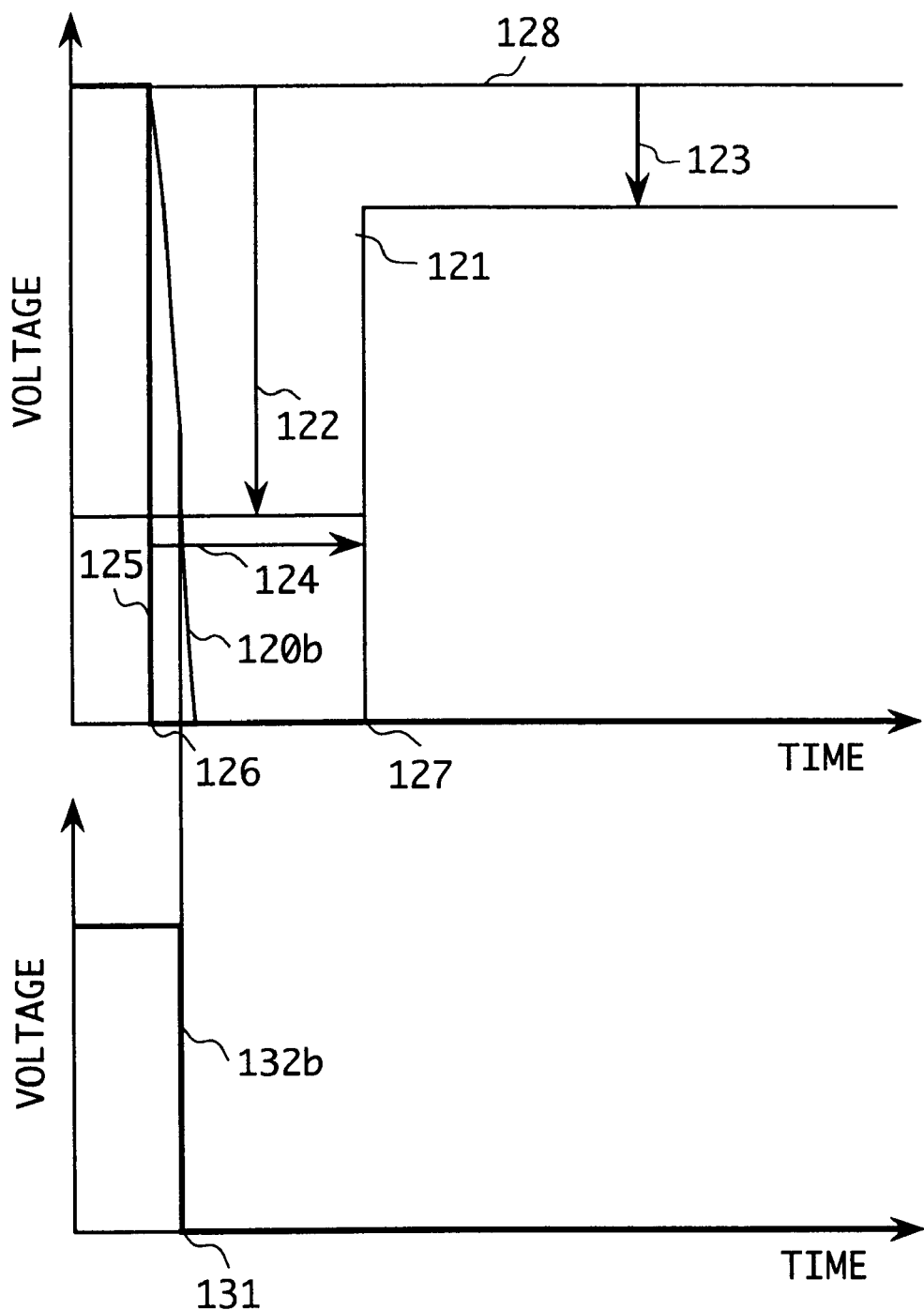
FIG. 4 shows graphs to explain operations of the power-feed control apparatus shown in FIG. 1 under another condition.

In the following, when an anomaly occurs in the control apparatus of this embodiment, operations of the control apparatus are explained with reference to FIG. 3 and FIG. 4. In these figures, numerals 120a, 120b, 132a, and 132b indicate voltage signals, and numerals 129 and 131 indicate points in time, respectively. First, assuming that the current gradually increases due to some anomaly which has occurred in the load 3 after the large starting current phase and the rapid current decreasing phase, the voltage drop at the resistor 108 increases as shown by the signal 120a in FIG. 3 (the voltage level 120 decreases). Further, since the voltage level of the signal 120a becomes lower than that of the signal 121 after the point 123 in time, the voltage level of the signal 132a output from the voltage-comparator 106 changes as shown in FIG. 3. Accordingly, the switch 102 turns to the OFF state after the point 129 in time. In case the load 3 has already been in a short-circuit state when the large starting current begins to flow, the voltage level of the signal 120b immediately decreases as shown in FIG. 4 just after the lamp has been lighted, and the voltage level of the output signal 132b from the comparator 6 decreases to the zero level at the point 131 in time. Thus, the switch 102 instantaneously turns to the OFF state.

Figure 7:
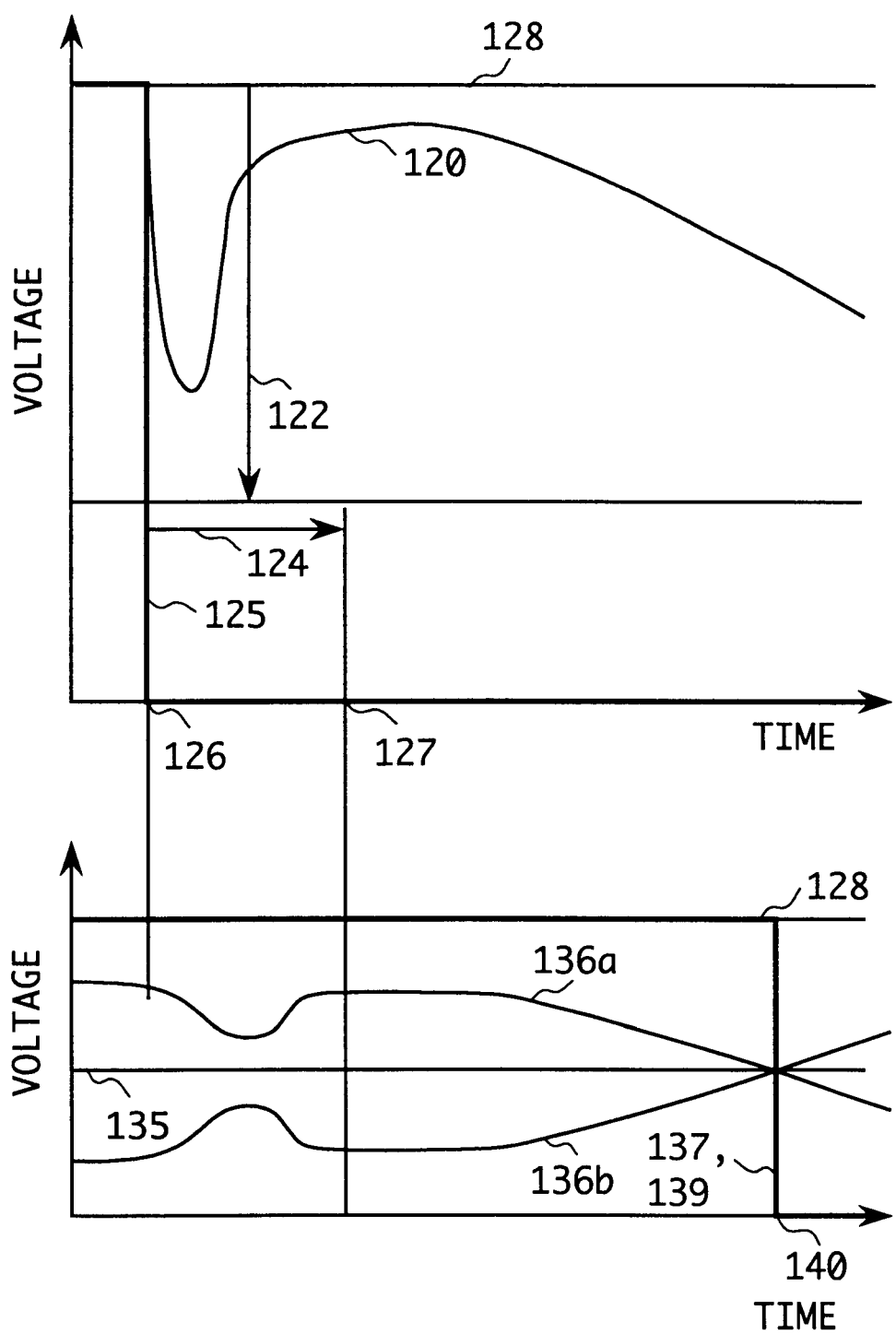
FIG. 7 shows graphs to explain operations of the power-feed control apparatus shown in each of FIG. 5 and FIG. 6.
Figure 8:
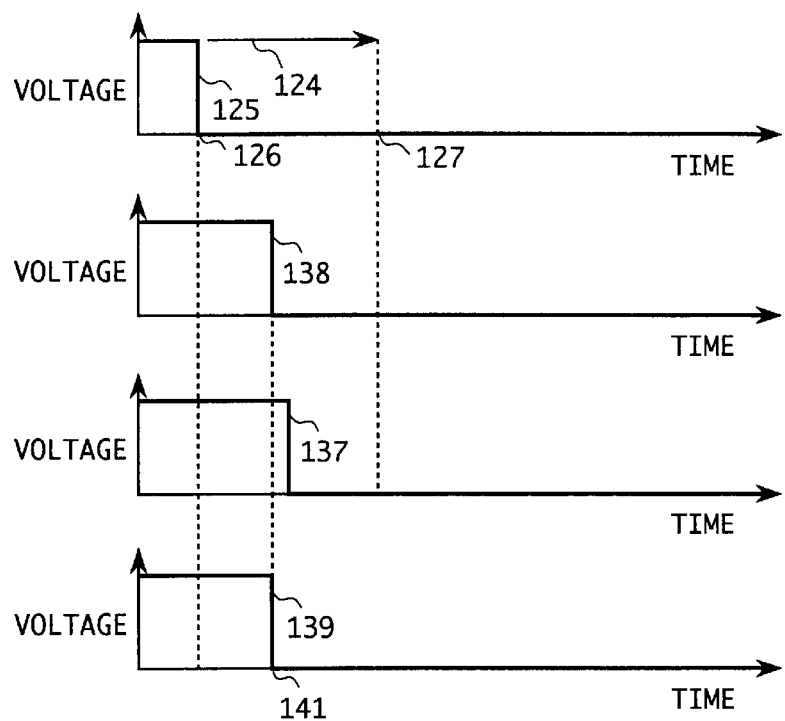
FIG. 8 shows other graphs to explain operations of the power-feed control apparatus shown in each of FIG. 5 and FIG. 6.
Figure 9:
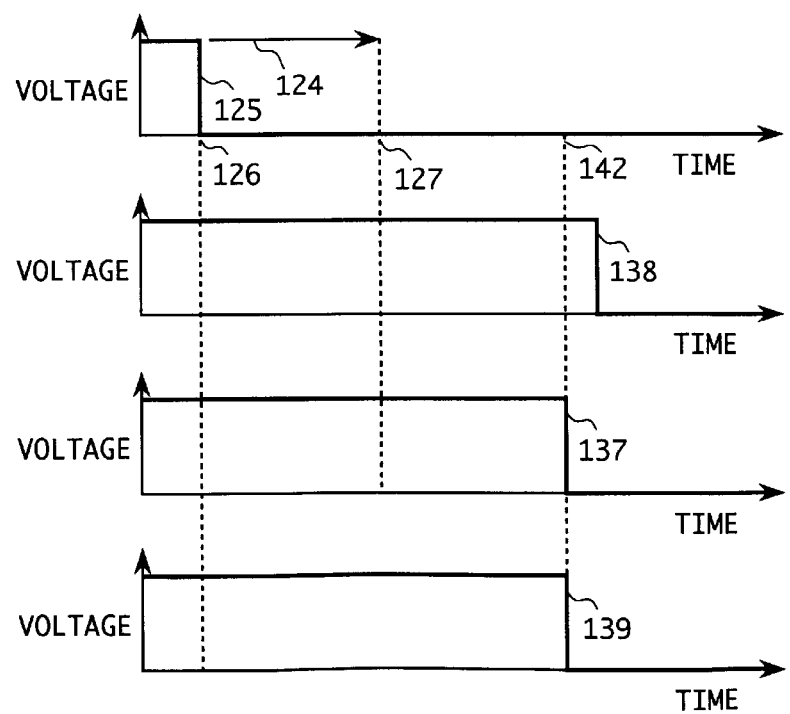
FIG. 9 shows graphs to explain operations of the power-feed control apparatus shown in each of FIG. 5 and FIG. 6 under another condition.

Although the current detecting method is adopted in the above embodiment, the similar effects can be obtained by detecting the temperature of a circuit including MOS-FET 2. Another embodiment for which this temperature detecting method is adopted is explained below with reference to FIG. 5 and FIG. 6. In these figures, numerals 133, 135, 136a, 136b, and 137–139 indicate voltage signals. Also, the power-feed control apparatus of this embodiment includes a Zener diode 152, a MOS-FET 151, a chip 150 on which a MOS-FET 151 and the Zener diode 152 are mounted so that the temperature of the element 151 is kept equal to that of the element 152. Also, numerals 153 and 155 indicate an excessive-temperature detection means and a constant-current source, and numerals 156–158, and 160 indicate resistors and a switching circuit, respectively. As well known, when current is passed through the Zener diode 152 in the reverse direction, the constant voltage is generated between the anode and cathode of the diode. This voltage has a positive gradient with respect to temperature. Assuming that the voltage drop at the resistor 156 is 6 V, the voltage drop at the resistor 157 is 6 V (=12−6). Further, the constant-current source 155 is provided to flow current of an appropriate level (several mA) in the Zener diode 152 so that the constant voltage generated by the Zener diode 152 is less than 6 V. Accordingly, the voltage level of the signal 136a is higher than 6 V. Similar to the case shown in FIG. 3, assuming that the current gradually increases due to some anomaly which has occurred in the load 3 and that the signal 120a changes as shown in FIG. 7, the temperature in the chip 150 gradually increases, which increases the voltage between both terminals of the Zener diode 152. Furthermore, the voltage level of the signal 136a changes as shown in FIG. 7, and the level of the signal 136 is compared with the threshold level 135 (6 V) by a comparator 154. The signal 137 shows changes as shown in FIG. 7. The switching circuit 160 outputs the signal 137 as the signal 139 if the level of the signal 133 is the high level, otherwise outputs the signal 138. Accordingly, after the point 127 in time, the signal 139 is equal to the signal 137, and if an anomaly is detected, the ON/OFF switch 102 is operated to the OFF state by the signal 137 output from the excessive-temperature detection means 153. Thus, an anomaly before the point 127 in time which is counted by the timer 101 is detected based on the change of the signal 138 output by the over-current detection means 100, and an anomaly after the point 127 in time is detected based on the change of the signal 137 output by the excessive-temperature detection means 153. Examples of signal change patterns in the above anomaly detection are shown in FIG. 8 and FIG. 9. In these figures, the numerals of the signals correspond to those in FIG. 5. That is, an anomaly of a rapid current change is indicated by the change of the signal 138, and the anomaly results in an anomaly of temperature which is indicated by the change of the signal 137. Moreover, after the current becomes steady, the current gradually increases again due to some anomaly and reaches the threshold value used in the over-current detection means 100. Thus, the two signals 137 and 138 change from the high level to the low level, one following the other, when an anomaly occurs. Meanwhile, the signal 139 output from the switching circuit 160 is in the high level state if an anomaly is not detected, otherwise in the low level state. Therefore, the switching circuit 160 can be replaced with an AND logic circuit.

Figure 5:
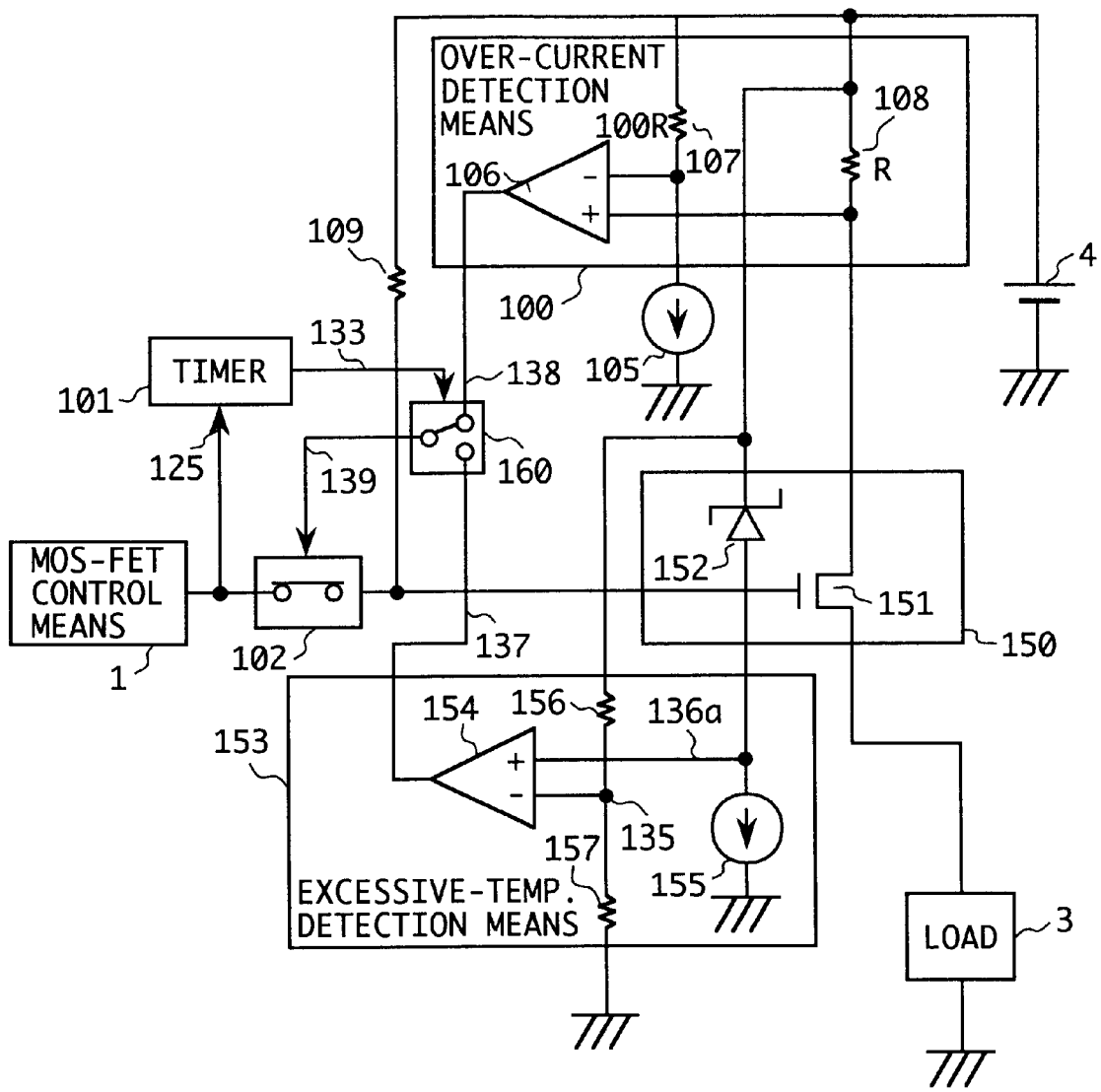
FIG. 5 is a schematic block diagram showing the composition of a power-feed control apparatus of another embodiment according to the present invention.
Figure 6:
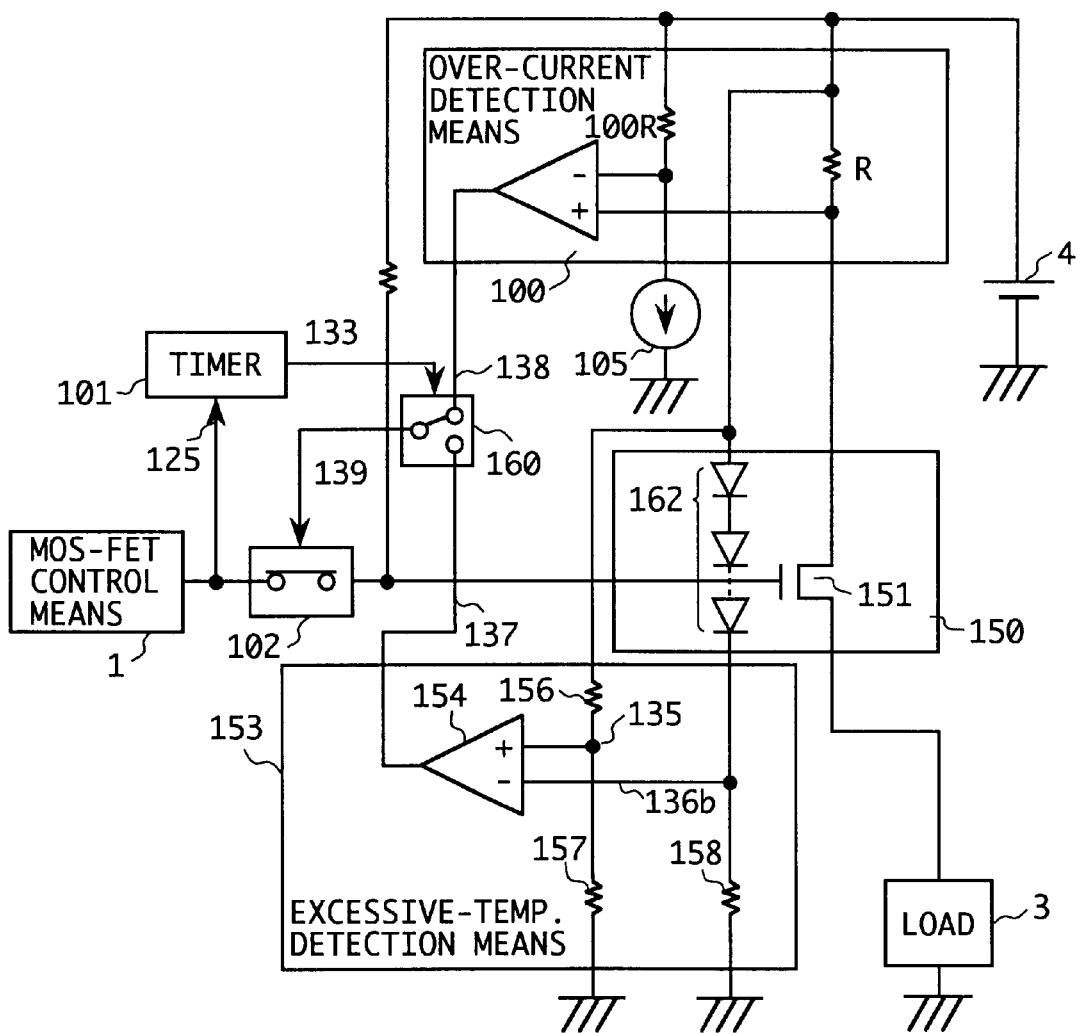
FIG. 6 is a schematic block diagram showing the composition of a power-feed control apparatus of another embodiment according to the present invention.

Although changes in the temperature of MOS-FET 151 are detected by the Zener diode 152 in the embodiment shown in FIG. 5, the embodiment shown in FIG. 6 detects changes in the temperature of MOS-FET 151 as changes in the voltage in the forward direction of usually used diodes. In FIG. 6, numeral 162 indicates a set of diodes serially connected to each other, which can detect a larger change in the voltage due to a change in the temperature than that in the voltage detected by one diode. Further, although numeral 158 indicates a resistor, a constant-current source can be used in place of the resistor 158, similar to the embodiment shown in FIG. 5. Since the voltage in the forward direction of one diode is about 0.6 V, the total voltage of 6 V (=½ of the voltage of the battery 4) can be obtained by serially connecting ten diodes. Moreover, the ratio of the resistance of the resistor 156 to that of the resistor 157 is adequately adjusted so that the voltage 135 is higher than that of the signal 136b. Since the voltage in the forward direction of the diode set 162 has a negative coefficient with respect to temperature, converse to that in a Zener diode, the voltage of the signal 136b changes as shown in FIG. 7 when the temperature of the diodes 162 increases. If the voltage of the signal 136b becomes higher than the voltage 135, the signal 137 turns from the high level state to the low level state. (Accordingly, the input signals 135 and 136b are input to the input terminals of the comparator 154, reverse to the positions of the input terminals to which the input signals 135 and 136a are input in the embodiment shown in FIG. 5.) The same effects as those obtained by the embodiment shown in FIG. 5 are also obtained by this embodiment. Hereafter, other embodiments to attain the object of the present invention by using the above-described over-current detection means and/or the excessive-temperature detection means will be explained.

Figure 10:
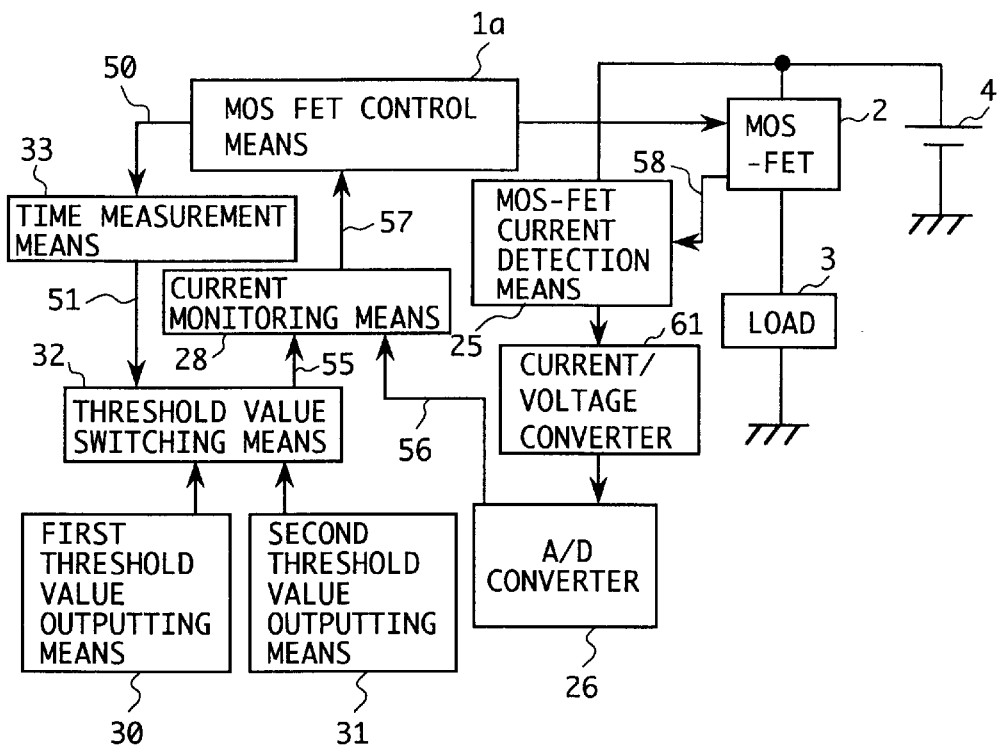
FIG. 10 is a schematic block diagram showing the composition of a power-feed control apparatus of another embodiment according to the present invention.

The power-feed control apparatus of another embodiment according to the present invention is explained below with reference to FIG. 10. As shown in FIG. 10, this power-feed control apparatus includes a MOS-FET (power element) control means 1a, a MOS-FET 2, a load 3, a battery (constant-voltage power supply) 4, a MOS-FET current detection means 25, a current/voltage converter 61, an A/D converter 26, a first threshold value outputting means 30, a second threshold value outputting means 31, a threshold value switching means 32, a time measurement means 33, and a current monitoring means 28. Numerals 50, 51, and 56–58 indicate electrical signals. Operations of this embodiment are explained with reference to FIG. 11. In this figure, numerals 40, and 44 and 45 indicate a time interval and points in time, and numerals 42 and 43 indicate the first and second threshold values for changes of current in a steady state. According to this embodiment, a protective function to attain the object of the present invention is realized by switching a protective mode from the first mode in which the large starting current flowing in the load 3 is compared with a large threshold value to the second mode in which the current in the steady state is compared with a smaller threshold value, which is triggered by the result of a time measurement performed by the time measurement means 33. If the MOS-FET 2 shown in FIG. 10 is turned on by the MOS-FET control means 1a at the point 44 in time shown in FIG. 11, current is fed to the load 3 from the battery 4 after the point 44 in time. Here, assuming that the load 3 is a lamp, current flows in the MOS-FET 2 and the lamp as shown by the graph 10. At the same time, the time measurement means 33 is triggered by the signal 50 output from the MOS-FET control means 1a at the point 44 in time. This time measurement is realized by a method of counting clock pulses generated with a constant period, using a general digital counter, or a method of comparing a preset constant voltage with the voltage at a CR (capacitor and resistor) circuit in a single-shot multivibrator, which begins to change by inputting a trigger signal to the multivibrator.

Figure 11:
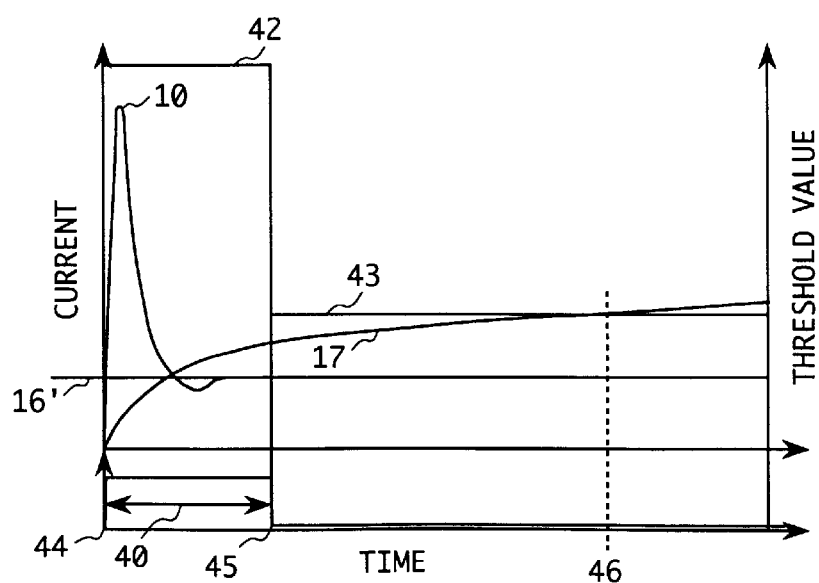
FIG. 11 shows graphs to explain operations of the power-feed control apparatus shown in FIG. 10.

Assuming that the measured time for the large starting current period is the time 40 shown in FIG. 40, this time means the period in which lighting of the lamp starts and is accomplished. In this period, it is necessary to secure the normal lighting of the lamp by permitting the large starting current (referred to as IB). Further, after this period, a comparatively small anomalous change of the current flowing in the MOS-FET 2 and the load 3 must be detected. Thus, the signal 51 is input to the threshold switching means 32 as a threshold switching signal from the time measurement means 33. The threshold switching means 32, which has received the signal 51, switches the threshold value to be input to the current monitoring means 28 as shown in FIG. 11. That is, the threshold switching means 32 inputs the comparatively large threshold value 42 during the time 40 and inputs the comparatively small threshold value 43 after the time 40 to the monitoring means 28. Accordingly, before the point 45 in time, the output signal from the threshold switching means 32 has the large value shown by the level 42, and this threshold value 42 (the output signal from the first threshold value outputting means 30) larger than the assumed peak value of the starting current flowing in the lamp is input to the monitoring means 28 as the output signal 55 from the switching means 32 via a signal line. After the point 45 in time, the output signal 55 from the switching means 32 is switched to the small threshold value (the output signal from the second threshold value outputting means 31) about twice as high as the level 16' of the steady current. The current monitoring means 28 continuously compares the value 56 of the present current, which is the digital data output from the A/D converter 25, with the threshold value of the output signal 55, and if the value 56 is larger than the threshold value of the signal 55 (at the point 46 in time in FIG. 11), the monitoring means 28 sends the control signal 57 for interrupting the power-feed to the lamp (load 3) to the MOS-FET 2. Although a method of estimating the value 56 of the present current will be explained later, roughly speaking, the value 56 is estimated by detecting the current signal 58 obtained by shunting the current fed to the load 3 via the MOS-FET 2 and converting the shunted current signal 58 to digital data with the current/voltage converter 61 and the A/D converter 26. The current monitoring means 28 can be composed, for example, of a digital comparator to compare two digital values. The signal 57 output from the comparator (the current monitoring means 28) is also used as an anomaly detection signal to indicate an occurrence of an anomalous current in the steady state, and the MOS-FET control means 1a which has detected the occurrence of the anomalous current by checking the signal 57 automatically turns off the MOS-FET 2.

As mentioned above, according to this embodiment, an anomalous current several times as large as the steady current can be detected, and the power-feed to the load 3 is automatically interrupted. Meanwhile, since the MOS-FET control means 1a in this embodiment differs from the MOS-FET control means 1 in the previous embodiments on a point that the signal 50 is output from the MOS-FET control means 1a and the signal 57 is input to the MOS-FET control means 1a, the MOS-FET control means 1a in this embodiment is distinguished from the MOS-FET control means 1 in the previous embodiments by labeling the former means with the reference symbol 1a. Although the analog current signal is converted to the digital quantity, and the digital quantity is processed by the digital comparator, etc. in this embodiment, it is naturally possible to compose the whole of the power-feed control apparatus with analog circuits using an analog voltage signal converted from the analog current signal. In the following, another embodiment shown in FIG. 12 is explained, in which a unit for converting only the large starting current to an analog voltage signal and the MOS-FET 2, etc., is integrated in an IC, only an anomaly in the large starting current is detected by the IC, and if the IC detects an anomaly in the starting current, the IC automatically turns off the MOS-FET 2.

Figure 12:
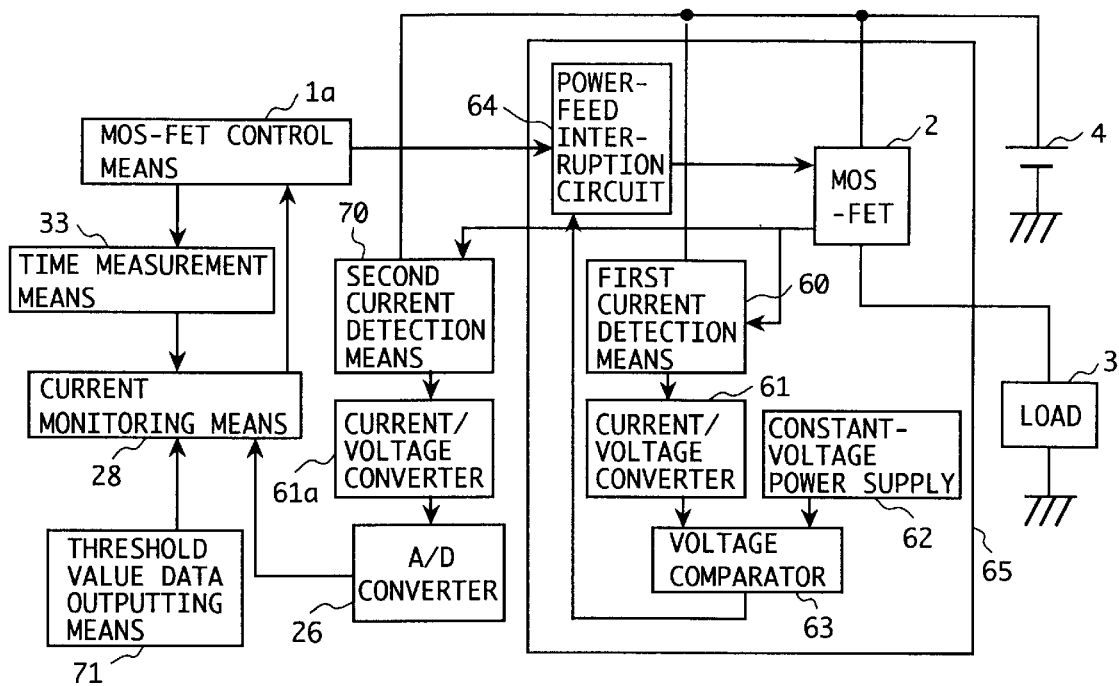
FIG. 12 is a schematic block diagram showing the composition of a power-feed control apparatus of another embodiment according to the present invention.

FIG. 12 shows a schematic block diagram showing the composition of the power-feed control apparatus of the above-mentioned embodiment according to the present invention. The power-feed control apparatus shown in this figure includes the first current detection means 60, the second current detection means 70, current/voltage converters 61 and 61a, a constant-voltage power supply 62, a voltage-comparator 63, a threshold value outputting means 71, and an interruption circuit 64. Here, each part shown in FIG. 12, which performs the same function as that of the part shown in FIG. 10, is labeled with the same numeral. Further, numeral 65 indicates a block performing an improved function with the MOS-FET 2, for detecting a large anomalous current in the starting current period and interrupting the power-feed to the load 3. This block 65 will be referred to as an improved MOS-FET in the later embodiments. That is, the block 65 is provided to interrupt a current flow larger than the assumed peak value in the starting current (IB), and the other block of the circuits is provided to detect a comparatively small anomalous change of current and to interrupt the power-feed to the load 3 if an anomalous change of current is detected. Moreover, a switching control is not performed for the two blocks. That is, the block 52 for the large current is always operated, and the other block is operated for the restricted time region (or the restricted state). In the block 65, the signal output from the first current detection means 60 is converted to a voltage signal by the circuit 61, and the converted voltage signal is compared with a constant voltage output from the circuit 62. The constant voltage output from the circuit 62 is a high voltage (referred to as VB) corresponding to the large starting current (IB) flowing in the load 3 such as a lamp. If the result performed in the voltage-comparator 63 indicates that the output signal from the circuit 61 is higher than VB, the MOS-FET 2 is turned off by the power-feed interruption circuit 64 triggered by an anomaly detection signal output from the voltage-comparator 63. In the block 65 for interrupting a large anomalous current, comparatively large errors or variances in the accuracy in the current detection or the comparing process can be permitted, and all the circuits in the block 65 can be integrated together in one IC chip.

On the other hand, operations of the other block for interrupting the power-feed to the load 3 when a comparatively small anomalous change of current is detected in the steady state is almost the same as those of the embodiment shown in FIG. 10. The second current detection means 70 can be provided inside or outside the block 65 which can be fabricated as an IC, and the block 65 detects a current signal, which reflects the amount of the current flowing in the load 3, obtained by shunting the current fed to the load 3. The shunted current signal is converted to a voltage signal by the circuit 61a composed of resistors, etc., and the voltage signal is further converted to a digital signal by the circuit 26. Further, an anomaly occurrence is monitored by the current monitoring means 28, which can be composed of a comparator and the like, by comparing the value of the digital signal with the threshold value output from the threshold value outputting means 71. This threshold value outputting means 71 corresponds to the second threshold value outputting means 31 shown in FIG. 10, and the value of the data output from the means 71 is the level 43 shown in FIG. 11. Usually, the value of this threshold value is set at the value corresponding to the voltage two or three times as high as the value of the digital data obtained by converting the steady current to a voltage signal with the circuit 61a and converting the voltage signal to the digital data with the circuit 26. However, the level of the steady current changes depending on the kind of the load 3 and the operational performance of each circuit. Therefore, it is effective to store a measured level of the steady current in a memory element in a micro processor, etc., and to calculate a threshold value corresponding to an operated load based on the stored measured level of the steady current, and an embodiment to which this method is applied is shown in FIG. 13.

Figure 13:
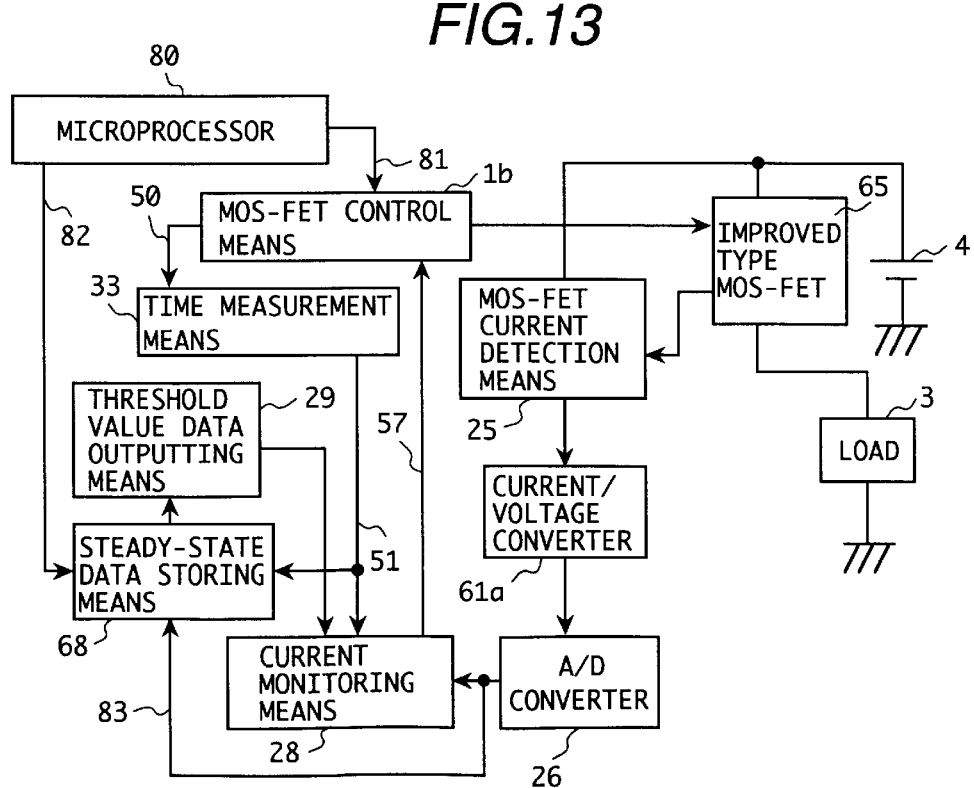
FIG. 13 is a schematic block diagram showing the composition of a power-feed control apparatus of another embodiment according to the present invention.

The power-feed control apparatus of the embodiment shown in FIG. 13 includes a steady-state data storing means 68, a threshold value calculating means 29, a microprocessor 80, an improved MOS-FET 65 for interrupting an anomalous large starting current, and a MOS-FET control means 1b. Numerals 81–83 indicate electrical signals. The microprocessor 80 controls the data storing means 68 so as to store the steady-state data. This operation of storing the steady-state data is now named an initial setting mode. Since this initial setting mode must be executed in the steady state after the current fed to the load 3 has become steady, the signal 51 output from the time measurement means 33 and an initial-setting command signal 82 are used to start the initial setting mode. That is, AND operation of the signals 51 and 82 is performed, and if the result of "true", it is determined that the current is in the steady state at the present time. Further, data of the steady current at the present time are input to the steady-state data storing means 68 as the data used for the initial setting mode via the signal line 83. To store the data, a digital latch circuit with a register of the bit-width equal to that of the signal line 83 is provided. Moreover, when this latch circuit receives the next digital data, the latch circuit is triggered, and the previously received digital data is then stored in the resistor. The result of the AND operation of the signals 51 and 82 (or the result of another logical operation of the previous result and another clock signal) is used as a trigger signal to start the data storing of the steady-state data storing means 68. Also, the trigger signal 81 is output to the MOS-FET control means 1b from the microprocessor 80, and the MOS-FET control means 1b further turns on the improved MOS-FET 65. Since the MOS-FET control means 1b has an additional input terminal to receive the trigger signal 81, this control means is labeled with the reference symbol "1b" to distinguish it from the MOS-FET control means in the previous embodiments. Meanwhile, since the trigger signal 81 is not output only at the initial setting mode by the microprocessor 80, in FIG. 13, it is shown such that the signal 81 is output by the microprocessor 80 separately from the signal 82 in this embodiment. After the steady-state data used for the initial setting mode are stored, the value of the steady-state level data is multiplied by an adequate multiple such as 2 or 3, or an adequate value is added to the value of the steady-state level data, in the threshold value calculating means 29. This threshold calculating means 28 can be composed of a general multiplier, etc., (or an adder, etc.), and if the multiple is fixed to 2, this means 28 can be composed of a shift register. The sensitivity of the anomaly detection in the steady state can be adjusted by changing the multiple used to obtain the threshold value based on the value of the stored steady-state level data, which is performed by the threshold value calculating means 29. That is, if a large number is used as the multiple, the sensitivity of the anomaly detection becomes low, and vice versa. Although the circuits 1b, 33, 29, 68, 28, etc., are separate hardware circuits in this embodiment, it is naturally possible to replace these circuits with programs processed in the microprocessor 80.

Figure 14:
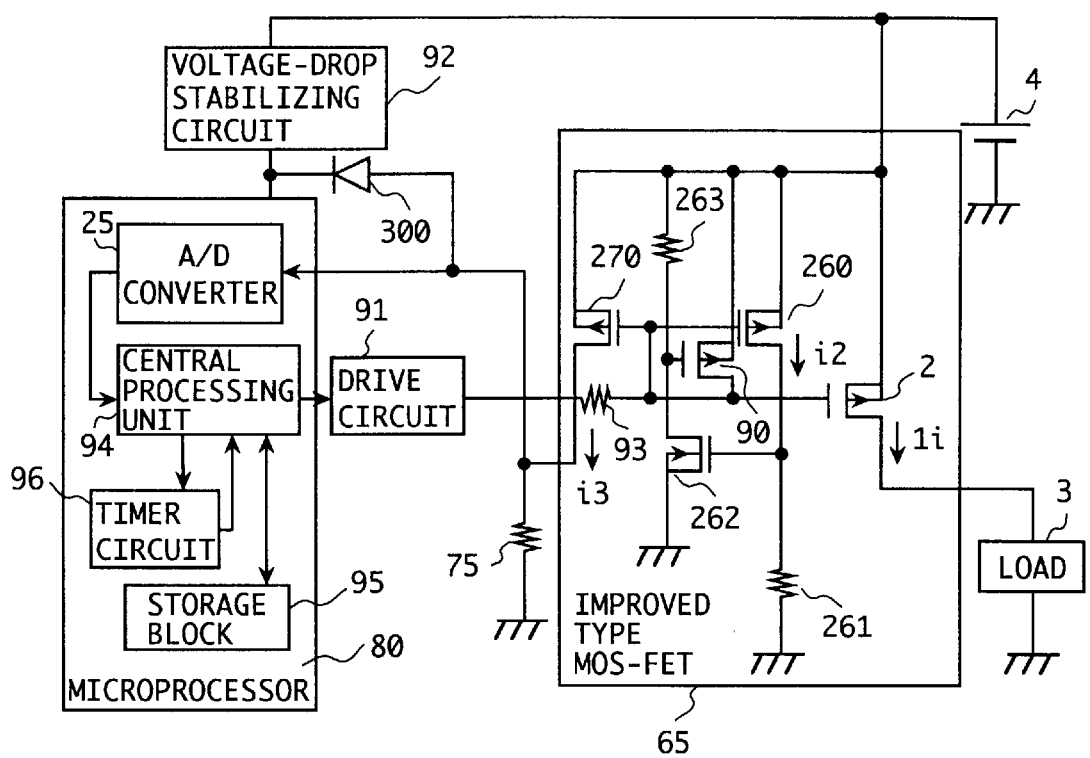
FIG. 14 is a schematic block diagram showing the composition of a power-feed control apparatus of another embodiment according to the present invention.
Figure 15:
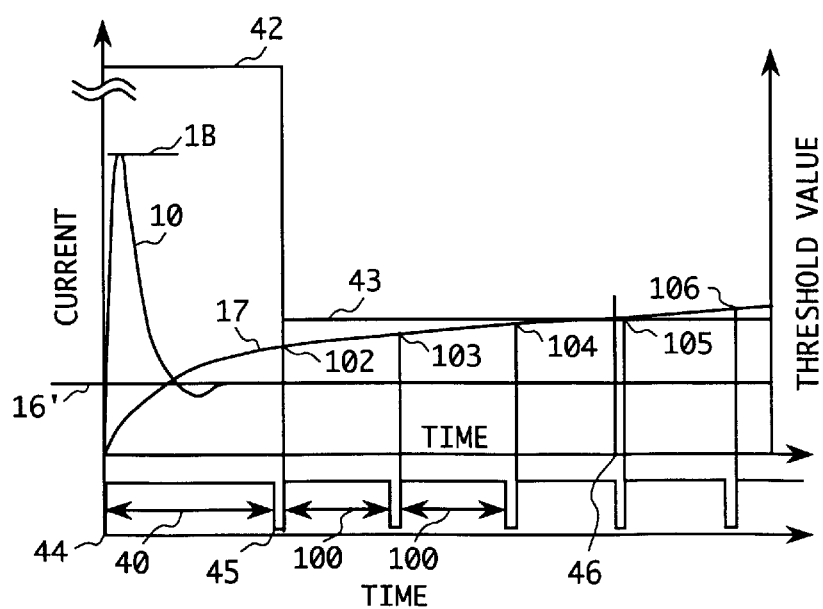
FIG. 15 shows graphs to explain operations of the power-feed control apparatus shown in FIG. 14.

Another embodiment in which the automatic power-feed interruption processing to control or protect the MOS-FET 2 is executed by the processor 80, and the current detection, etc., are performed by circuits, is explained below with reference to FIG. 14 of a schematic block diagram showing the composition of this embodiment and FIG. 15 showing operations of this embodiment. The improved MOS-FET 65 shown in FIG. 14 includes MOS-FETs 260 and 270 used for the current detection means, resistors 261, 263, and 75 used for current/voltage converters, a MOS-FET 90 used for the automatic power-feed interruption (which corresponds to a function implemented, for example, by integration of the constant-voltage power supply 62, the voltage-comparator 63, and the power-feed interruption circuit 64 shown in FIG. 12), a voltage drop stabilizing circuit 92, a protective resistor 93 for preventing a large current from flowing between a drive circuit 91 of the MOS-FET 2 and the MOS-FET 2 when the MOS-FET 90 is turned on. Outside of the improved MOS-FET 65, numerals 94, 95, and 96, and numeral 300 indicate a central processing unit, a storage block, and a timer circuit provided in the microprocessor 80, and a (protection) diode, respectively. Moreover, symbols i1–i3 indicate current flows. The graphs shown in FIG. 15 are almost the same as those shown in FIG. 11. In FIG. 15, numerals 102–106 indicate values sampled in a current signal 17, which are converted to voltage values. Further, the converted voltage values are converted to digital data by the A/D converter 25, and the digital data are input to the microprocessor 80.

The ratios of values of the respective current flows in the MOS-FETs 260 and 270 to a value of the current flow in the MOS-FET 2 are held constant. Therefore, the proportional relation is held among the current flows i1, i2, and i3 shown in FIG. 14. Particularly, the accurate proportional relation between i1 and i2 can be realized by appropriately adjusting the sizes of the MOS-FET 2 and MOS-FET 260 neighboring each other arranged in the improved MOS-FET 65. Further, the MOS-FET 2 and MOS-FET 260 are designed such that the ratio of the current flow i2 to the current flow i1 flowing in the load 3 is very low, which can reduce the current flow used for the current detection, and can also increase the efficiency in driving the load 3. Thus, if the ratio among sizes of MOS-FETs 2, 260, and 270 is set, for example, as (100:1:1), the ratio (i1:i2:i3) also becomes (100:1:1). Accordingly, if a current flow of 1 A is fed to the load 3, the values of the current flows used for the current detection, which flow in the MOS-FETs 260 and 270, can be decreased to 10 mA.

In the following, operations of this embodiment will be explained. In this explanation, it is assumed that the load 3 is a lamp, and the lamp is turned on by the control executed by the microprocessor 80. First, the central processing unit 94 in the microprocessor 80 sends a control signal to light the lamp to the drive circuit 91, and the drive circuit 91 outputs a high level signal to the left terminal of the resistor 93. These operations are performed at the point 44 in time shown in FIG. 15. Further, the MOS-FET 2 is also turned on, and power is fed to the load 3 (lamp). A current monitoring method performed in this embodiment is explained below by taking the automatic power-feed interruption as an example. First, since the temperature of a tungsten filament of the lamp is low, the resistance of the filament is small. Therefore, the large starting current IB shown by the graph 10 flows in the MOS-FET 2. If the peak of the large current IB is 20 A, the current of 200 mA which is one hundredth of 20 A flows in the MOS-FETs 260 and 270. Here, the limit level for the automatic interruption to the anomalous large peak of IB which is performed by the MOS-FET 90 is set at the level twice as high as 20 A. That is, the current of 40 A flowing in the load 3 (the level 42 shown in FIG. 15) is determined to be anomalous. Therefore, assuming that the ON gate voltage of the MOS-FET 90 is 1 V, the resistor 261 is set such that the voltage drop at the resistor 261 is 1 V when the current of 400 mA (one hundredth of 40 A) flows in the resistor 261. Thus, by setting the resistance of the resistor 261 as 2.5 Ω, the gate voltage of the MOS-FET 262 is 1 V when the current i2 of 400 mA flows in the resistor 261. Also, the resistance of the resistor 263 is set as 2.5 Ω so that when the gate voltage of the MOS-FET 262 is 1 V, the drain current of 400 mA flows. In usual lighting of the lamp, since the maximum value of IB is 20 A, and the gate voltage of the MOS-FET 90 increases to 0.5 V at most, the MOS-FET 90 is not turned on. If the MOS-FET 90 is turned on by a large anomalous current, the current from the battery 4 flows into the ground by the MOS-FET 90, and the MOS-FET 2 is turned off (the interruption state). According the above composition of the improved MOS-FET 65, the automatic power-feed interruption function can be realized even for a greatly large anomalous current.

Next, the protective function in the steady state in which the level of the current is comparatively low due to the large resistance of the lamp in the steady state, which is caused by heating of the filament of the lamp, is explained. Since the current i3 flowing in the MOS-FET 27 is also proportional to the current i1 flowing in the lamp, changes of the current i1 can be monitored by measuring the voltage drop at the resistor 75. The voltage drop is converted to a digital signal by the A/D converter 25, and the converted digital signal is input to the central processing unit 94. Since the central processing unit 94 in the microprocessor 80 controls the timing of starting to light the lamp (the point 44 in time shown in FIG. 15) by driving the drive circuit 91, the timer circuit 96 is started at this timing. Afterward, when a predetermined time shown by the time 40 has elapsed, the timer circuit 96 transmits this information to the central processing unit 94. At this timing (the point 45 in time shown in FIG. 15), the central processing unit 94 compares the value of the signal output from the A/D converter 25 with the value of the data stored in the storage block 95 in advance, this data corresponding to the second threshold data output from the outputting means 31 shown FIG. 10, the output signal from the outputting means 71 shown in FIG. 12, and the level 43 shown in FIG. 14, respectively. If the result of the comparison indicates that the signal output from the A/D converter, which corresponds to the current flowing in the lamp, exceeds the stored data, that is, the threshold value, the central processing unit 94 sends a turning-off signal to the drive circuit 91. Since other processing cannot be executed if the computing capacity of the central processing unit 94 is occupied only by the comparison processing, programs to be processed for the microprocessor 80 should be appropriately designed. That is, in the program to execute the comparison processing, the current monitoring (monitoring the data output from the A/D converter 25) is executed by sampling the signal of the voltage at the resistor 75 with an appropriately preset period (the time 100 shown in FIG. 15). The signal sampling is performed by adjusting the time set to the timer circuit 96 to the time 100, by using another timer circuit, and so on. Naturally, in case that the time 40 is equal to the time 100, only if one time interval of the time 40 (the time 100) is set to the timer circuit 96 once, the process of changing the set time or another timer is not necessary. As shown in FIG. 15, if values of the sampled data 102, 103, 104 . . . , gradually increase, an anomaly can be detected at the point when the data signal 105 larger than the threshold level 40 is input to the microprocessor 80.

The voltage of a battery (the voltage of the power supply 4) used in a vehicle is usually about 12 V, and this voltage is far higher than the voltage (about 5 V) usually used in the microprocessor 80. Therefore, the voltage of the power supply 4 is decreased by the voltage-drop stabilizing circuit 92. Moreover, the diode 300 is inserted between the stabilizing circuit 92 and the microprocessor 80 to prevent an accident in which the terminal voltage of the resistor 75, that is, the voltage at the input port of the A/D converter 25 becomes higher than the output voltage of the voltage-drop stabilizing circuit 92, and the microprocessor 80 breaks down.

Figure 16:
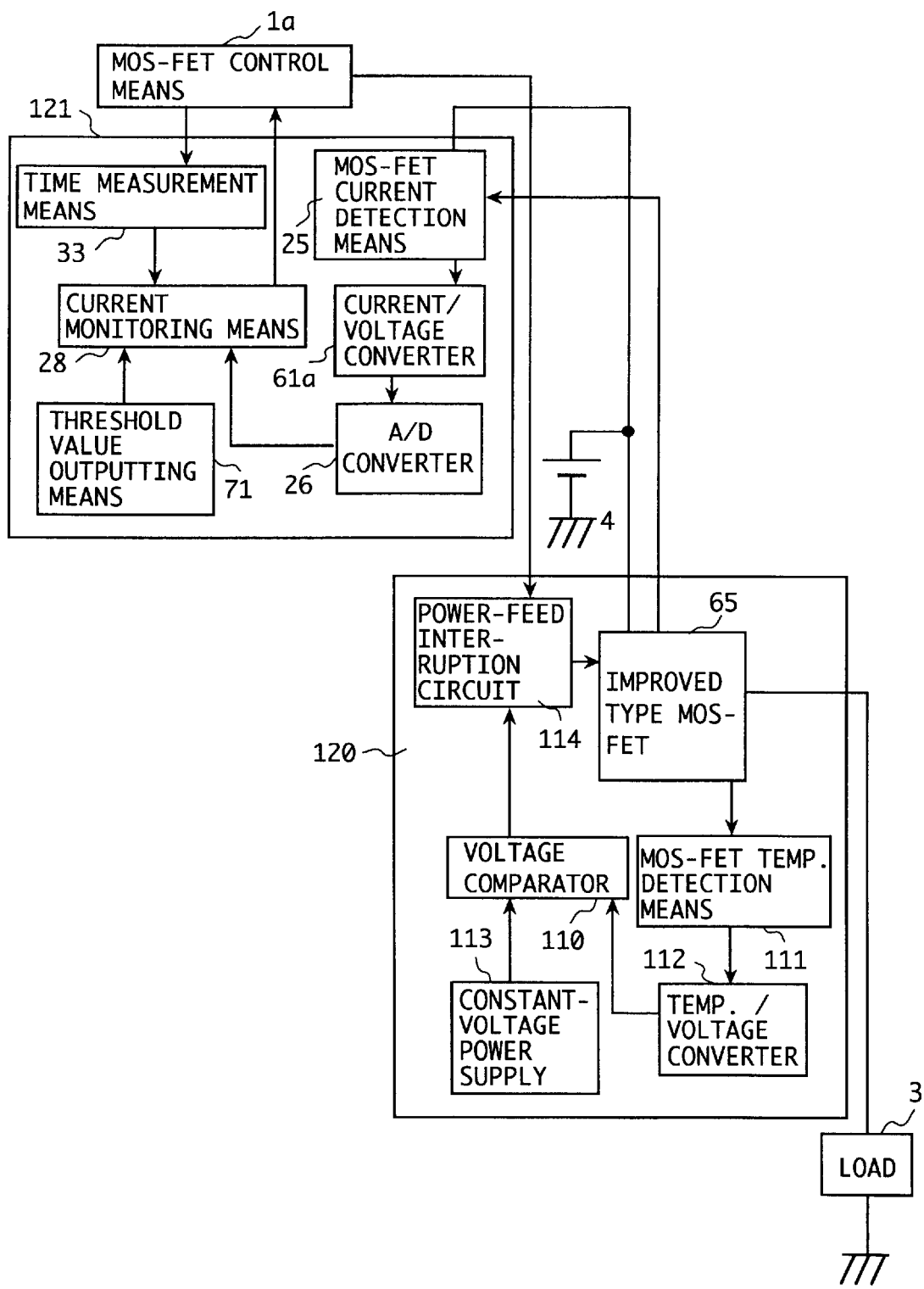
FIG. 16 is a schematic block diagram showing the composition of a power-feed control apparatus of another embodiment according to the present invention.

Although only the anomalous current detection method according to the present invention is performed in the embodiments shown in FIGS. 10–14, the anomalous MOS-FET temperature detection method according to the present invention can be naturally combined with the anomalous current detection method. FIG. 16 shows an embodiment in which the anomalous MOS-FET temperature detection method combined with the anomalous current detection method is performed. An improved temperature-type protective MOS-FET 120 shown in FIG. 16 includes a voltage-comparator 110, a temperature detection means for detecting the temperature of the improved MOS-FET 65 (the MOS-FET with a function to automatically interrupt a large anomalous current), a temperature/voltage converter 112, and a power-feed interruption circuit 114. Further, A block 121 indicates the current-type protective circuit used in the steady state of current. The power-feed interruption circuit 114 and the constant-voltage power supply 113 can be commonly used by the improved temperature-type protective MOS-FET 120 and the improved MOS-FET 65. Moreover, this improved temperature-type protective MOS-FET 120 can be integrated in a one-chip IC. Since the detection of an anomalous temperature is generally delayed in comparison with the detection of an anomalous current, the improved temperature-type protective MOS-FET 120 detects an anomaly in the transient state until the protective circuit used in the steady state of current starts to operate, and if the improved temperature-type protective MOS-FET 120 detects an excessive-temperature due to heating of the MOS-FET 2, the protective MOS-FET 120 interrupts the power-feed to the lamp. Although a state holding circuit (a latch circuit, a flip-flop circuit, etc.) is not provided in FIG. 16, a state holding circuit can be naturally added to the protective MOS-FET 120.

Figure 17:
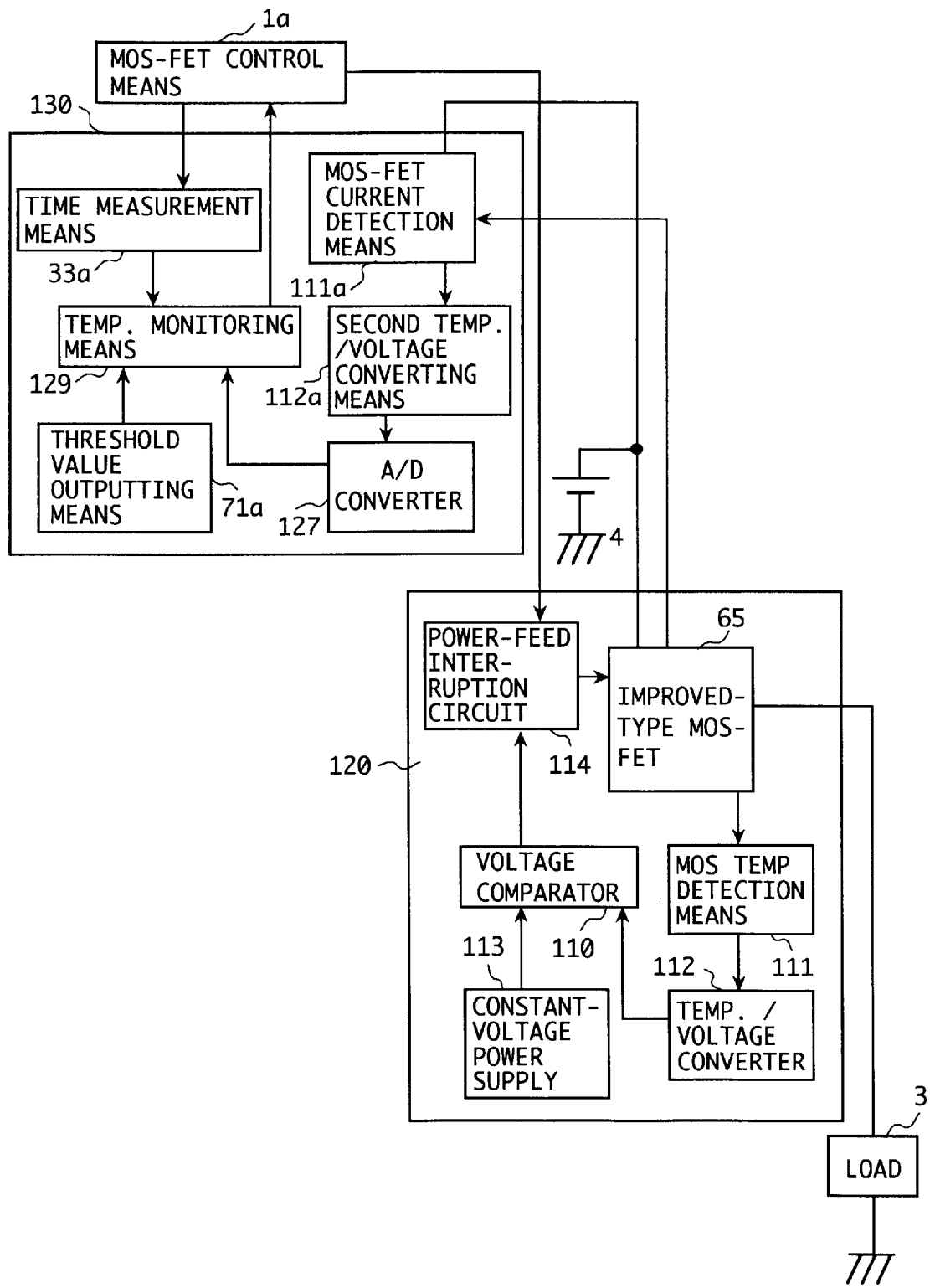
FIG. 17 is a schematic block diagram showing the composition of a power-feed control apparatus of another embodiment according to the present invention.

Furthermore, since a slight delay of several tens ms is permitted in the detection of an anomaly in the steady state of current, the current-type protective circuit 121 can be replaced with a temperature-type protective circuit. FIG. 17 shows an embodiment in which the block 120 in the embodiment is replaced with a temperature-type protective circuit 130, and this embodiment is briefly explained below.

The temperature-type protective circuit 130 shown in FIG. 17 includes a second MOS-FET temperature detection means 11a, a second temperature/voltage converter 112a, an A/D converter 127, a threshold value outputting means 71a, a temperature monitoring means 129, and a time measurement means 33a, and these means correspond to those in the current-type protective circuit 120 shown in FIG. 16 for detecting an anomaly in the steady state of current. First, the temperature detected by the second temperature detection means 11a is converted by the second temperature/voltage converter 112a to a voltage signal, and further converted to a digital signal by the A/D converter 127. Further, the temperature monitoring means 129 monitors temperature changes in the steady state of current by comparing the value of the converted digital signal with the threshold value sent from the threshold value outputting means 71a. Since the temperature slightly increase due to the large starting current if the load 3 is a lamp, the operation of this temperature-type protective circuit 130 is stopped by using the time measurement means 33a during the transient state in the initial starting period of the lamp, in which the current flowing in the lamp greatly changes.

Figure 18:
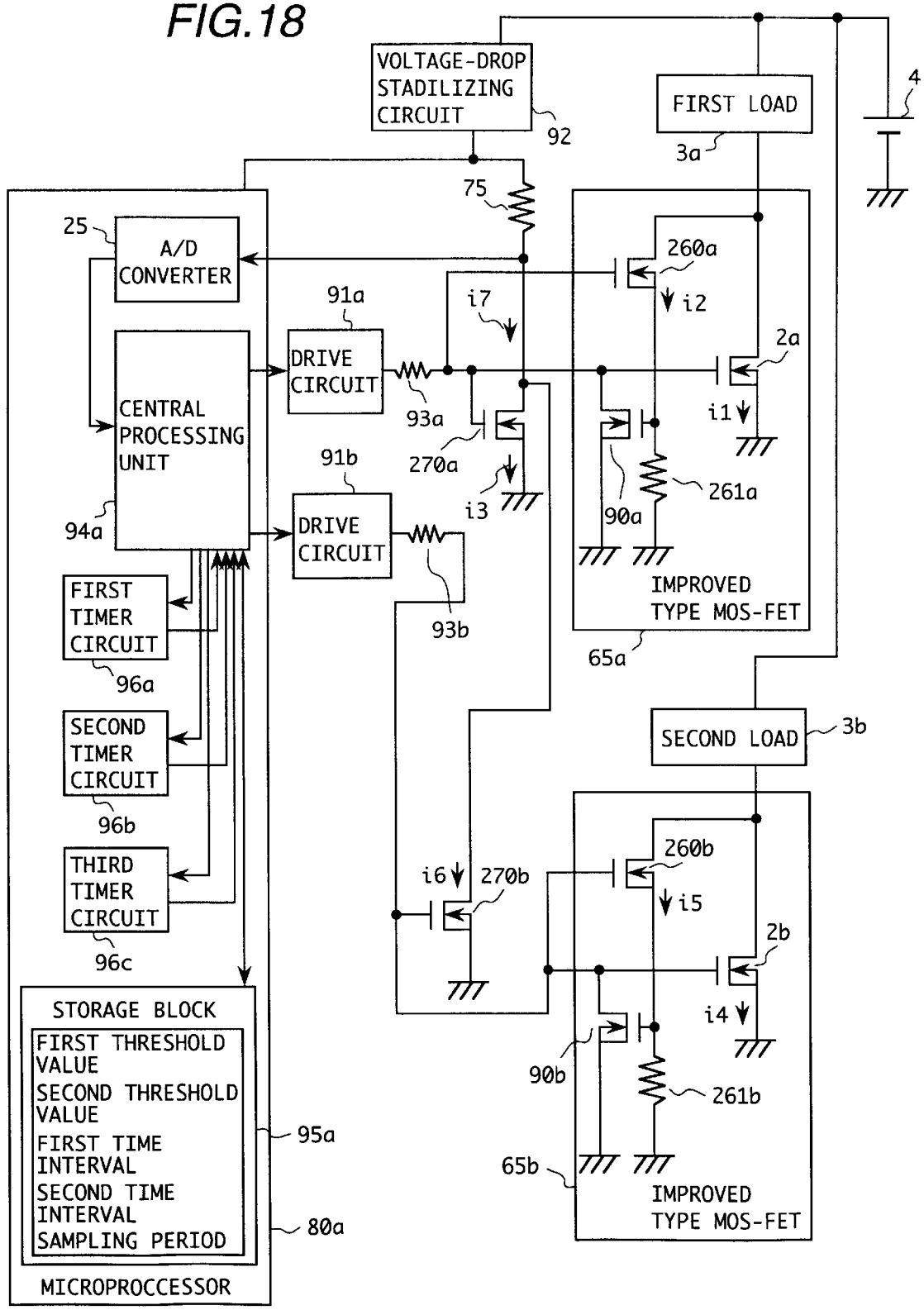
FIG. 18 is a schematic block diagram showing the composition of a power-feed control apparatus of another embodiment according to the present invention.
Figure 19:
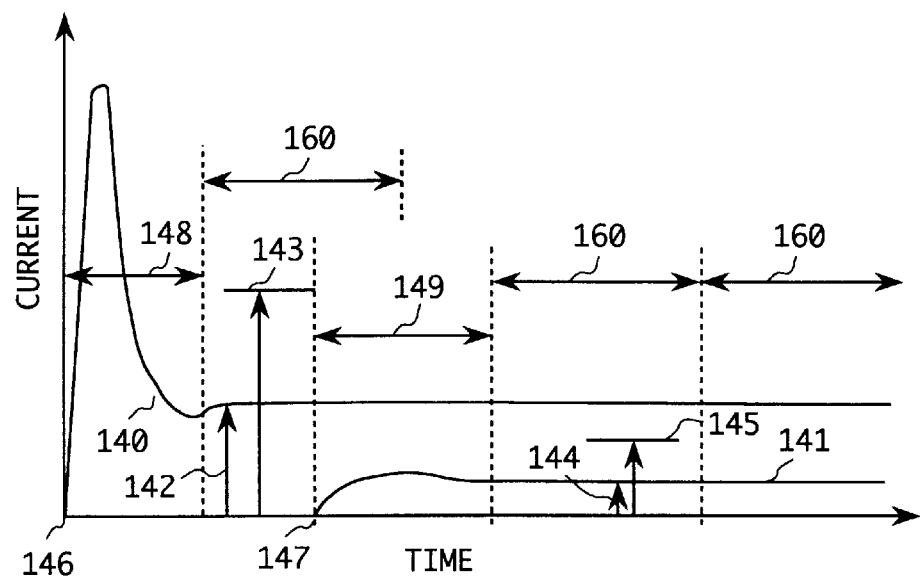
FIG. 19 shows graphs to explain operations of the power-feed control apparatus shown in FIG. 18.
Figure 20:
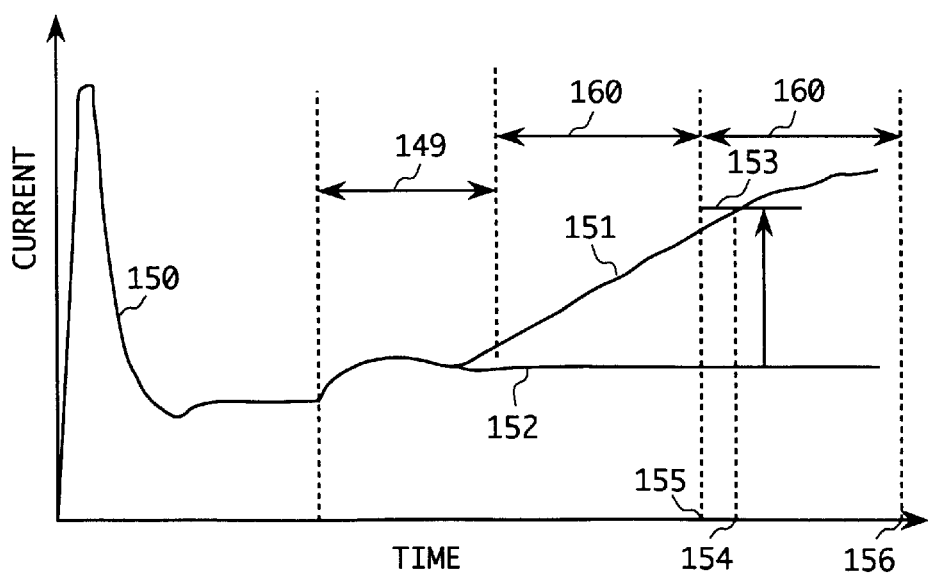
FIG. 20 shows graphs to explain operations of the power-feed control apparatus shown in FIG. 18 under another condition.

In the following, an embodiment according to the present invention, in which a plurality of loads are operated, will be explained with reference to FIGS. 18–20. FIG. 18 is a schematic block diagram showing the composition of the power-feed control apparatus of this embodiment, and this control apparatus includes MOS-FETs 2a and 2b functioning as switches, MOS-FETs 260a and 260b used as current detection means, resistors 261a, 261b, and 75 used as current/voltage conversion means, blocks 65a and 65b indicating the improved MOS-FETS for automatically interrupting a large anomalous current in the initial starting period, each of which is fabricated as an IC, MOS-FETs 270a and 270b provided outside the above ICs and used as current detection means, drive circuits 91a and 91b, protective resistors 93a and 93b, a central processing unit 94, first, second, and third timer circuits 96a, 96b, and 96c, and a storage block 95, a microprocessor 80a. Here, the symbols i1–i3 indicate current flows. In FIG. 19, numerals 140 and 141 indicate the current flows in the loads 2a and 2b, and numerals 142 and 143 indicate current levels in the steady state of the current flows 140 and 141. Moreover, numerals 143 and 145 indicate threshold values calculated based on the above current levels in the steady state (each threshold value is set at the value about twice as high as the corresponding current level in the steady state in this embodiment). Further, numerals 146 and 147 indicate points in time, and numerals 148, 149, and 160 indicate time intervals. In FIG. 20, numeral 150 indicates a current signal input into the microprocessor 80a, and numerals 151, 152, and 153 indicate a normal current signal, an anomalous current signal, and a threshold value for the anomaly detection, respectively. Moreover, numerals 154–156 indicate points in time. Meanwhile, although each of the first and second loads is connected to the side of the battery 4, these loads can be naturally connected to the side of the ground. Here, attention must be paid on a point that when the loads are connected to the side of the ground, the type of MOS-FETs used is different from that of the MOS-FETs in the case of connecting the load to the side of the battery 4, and the polarity of the loads are reversed (for example, although the MOS-FETS 2a and 2b are turned on when the output signals from the drive circuits 91a and 91b are high level signals in this embodiment shown in FIG. 18, the MOS-FET 2 is turned on when the output signal from the MOS-FET control means 1 or the drive circuit 91 is the low level signal in the previous embodiments including one shown in FIG. 17).

Operation of this embodiment is explained below. It is assumed that the current flowing in the load 3a of a lamp and the load 3b of a motor change as shown by the graphs 140 and 141 in FIG. 19, respectively. Generally, the starting timing and the transient period in which the large starting current flows in a load changes depending on the kind of the load, and in this embodiment also, as shown in FIG. 19 and FIG. 20, the point 146 of the starting timing and the time interval 148 of the transient period for the first load 3a differ from the point 147 and the time interval 149 for the second load 3b, respectively. The current is fed to the first load 3a via the drive circuit 91a, the resistor 93a, and the MOS-FET 2a, and the current is also fed to the second load 3b via the drive circuit 91b, the resistor 93b, and the MOS-FET 2b. The protective function in the large starting current (IB) period for the first load 3a is realized by combining the circuits 260a, 261a, and 90a. Also, The protection function in the large starting current (IB) period for the second load 3b is realized by combining the circuits 260b, 261b, and 90b. In combining the circuits, it is assumed that the ratio of the current flow for the current detection to the current flow in the load, or the ratio of the size of one element to that of the other corresponding element (for example, the ratio of the current flow in or the size of the MOS-FET 2a to the current flow in or the size of the MOS-FET 90a), is adjusted. Moreover, it is assumed that the continued ratio of the current flows i1, i2, i3, i4, i5, and i6 is assumed. Therefore, the sum i7 of the current flows i3 and i6 is proportional to the sum of the current flowing in the first and second loads (referred to as the total load current flow). Further, the current flow i7 is converted to a voltage signal by the resistor 75. Furthermore, this voltage signal is converted to digital data by the A/D converter 25 provided in the microprocessor 80a. Changes of the converted digital data are shown by the graph 150 in FIG. 20, indicating changes of the sum of the current flows in the first and second loads. Therefore, in the normal state, the value of the digital data converges to the current level 152 of the sum of the steady values of the current flows 140 and 144 shown in FIG. 19. The steady state current flows are monitored by using the data stored in the storage block 95a. In the storage block 95a, the first and second threshold data correspond to the threshold levels 143 and 144, respectively. Further, the first and second time interval data are set to the first and second timer circuits 96a and 96b to count the time intervals 148 and 149, respectively. Moreover, the sampling period data is set to the timer circuit 96c to count the period with which the signal to be input to the A/D converter 25 is sampled. The central processing unit 94a sets those data to the timer circuits 96a, 96b, and 96c, and monitors the steady state current flows.

In the following, by mainly showing operations of the microprocessor 80a, operations of this embodiment will be explained more in detail. First, the central processing unit 94a controls an output port of the microprocessor 80a so as to send the high level signal, and simultaneously sets the first time interval data to the first timer circuit 96a. Further, the central processing unit 94a reads the threshold value data corresponding to the threshold level 143 from the storage block 95a before the first timer circuit 96a finishes the counting of the time interval 148. At the point when the time interval 148 has elapsed, the first timer circuit 96a sends an interruption signal to the central processing unit 94a. after this point in time, it becomes possible that a present steady value of the graph 150 corresponding to that of the current flow i3 is compared with the first threshold data. That is, the timer circuit 96c is started, and after the time interval 160 has elapsed, inputting of the sampled data via the A/D converter 25 to the central processing unit 94a is started. In the case shown in FIGS. 19 and 20, since power-feed to the other load 3b is started before the time interval 160 elapses, and this time interval 160 partially overlaps the time interval 149 in which the starting current flows in the second load 3b, the data comparison processing is not executed at the point when the time interval 160 has first elapsed. After the time interval 149 has elapsed, the current flowing in each of the loads 3a and 3b attains each steady value. Since the current flowing in each of the loads 3a and 3b is shunted with an appropriate ratio, the sum i7 of the current flows i3 and i6 is proportional to the sum of the two load current flows. Further, the sum i7 is converted to the voltage signal by the resistor 75, and the converted voltage signal is further converted to digital data by the A/D converter 25. Furthermore, the digital data indicating the total load current is input to the central processing unit 94a. Next, at the point when the time interval 149 has elapsed, the data comparison processing performed for the total load current is started. The threshold value used for this comparison processing is the level 153 shown in FIG. 20 which is the sum of the threshold values 143 and 145. In the normal state, the total load current converges to the level 152. However, if some anomaly such as locking of an operating motor due to a foreign part inserted into the motor occurs, the total load current increases as shown by the graph 151, and the occurrence of the anomaly can be detected after the point 154 in time by the data comparison processing. Actually, since the anomaly detection based on the data comparison processing is performed at the timing (the points 155, 156, and so on) set to the third timer circuit 96c, the point when the anomaly is first detected is the point 156 in time.

Figure 21:
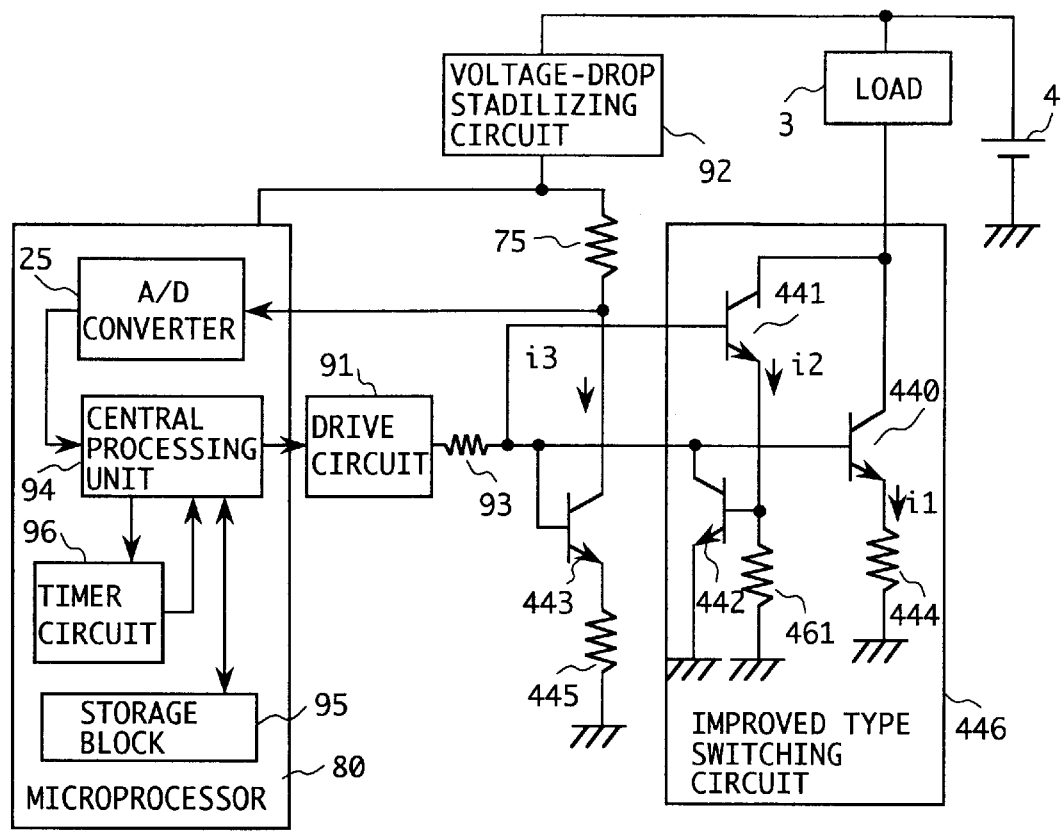
FIG. 21 is a schematic block diagram showing the composition of a power-feed control apparatus of another embodiment according to the present invention.

Although the MOS-FETs are used as switching elements in the above embodiment, the MOS-FETs can be replaced with bipolar transistors as shown in FIG. 21. In this figure, numerals 440–443, and numerals 444, 445, and 461, indicate npn-type transistors and resistors, respectively. However, to maintain the accuracy in the ratios of the current flows i2 or i3 to the load current i1, it is sometimes necessary to further add resistors 144 and 145 (not shown in this figure).

According to the above embodiments, the anomaly causing the gradual increase of the total load current in the steady state region can be detected as explained above. However, it cannot be determined yet which load has become anomalous. Thus, another embodiment is explained below with reference to the flow charts shown in FIGS. 22–24, in which the central processing unit 94a executes a program to implement algorithm for detecting an anomalous one in a plurality of loads.

Figure 22:
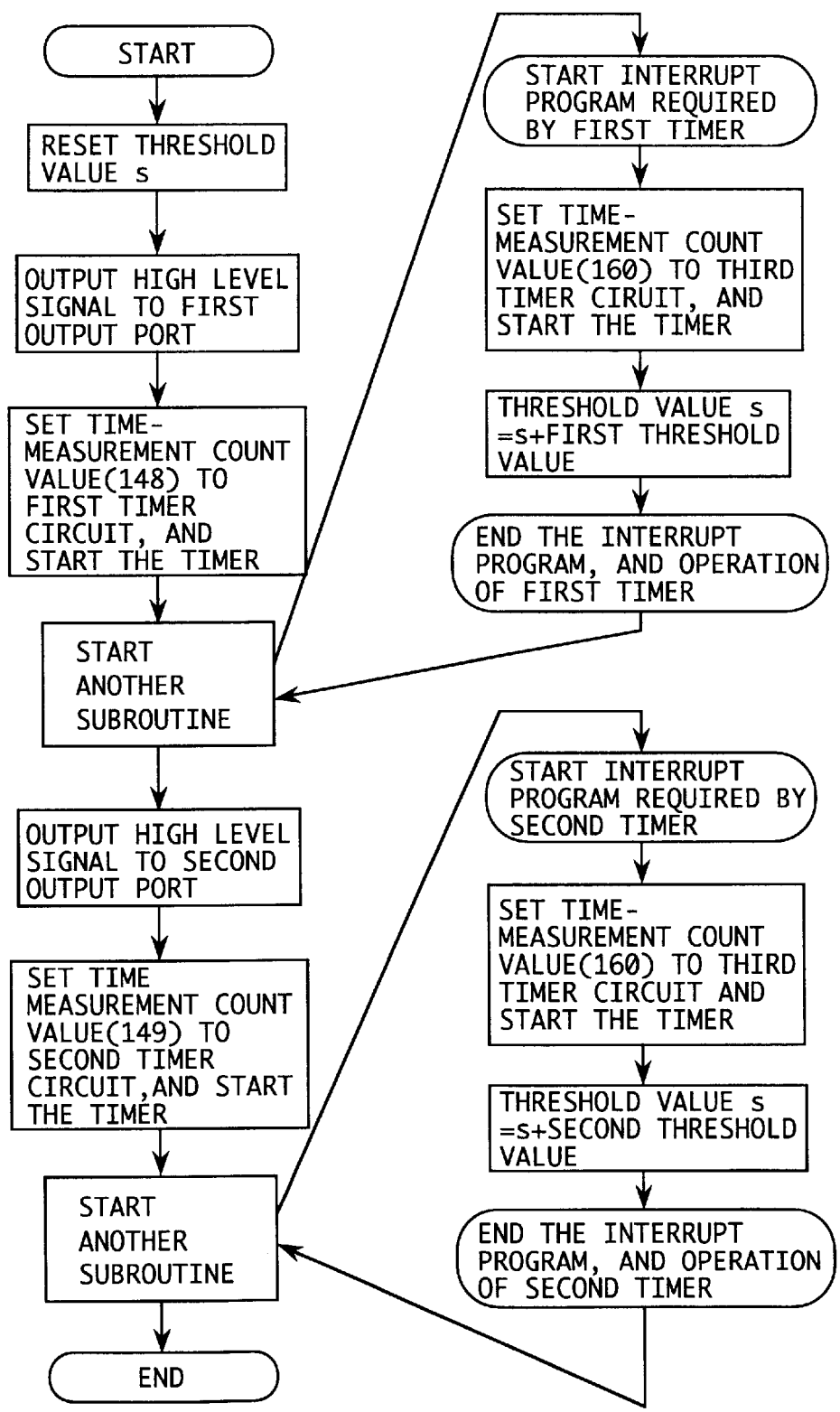
FIG. 22 is a flow chart of a program executed by the central processing unit shown in FIG. 18 and FIG. 21.
Figure 23:
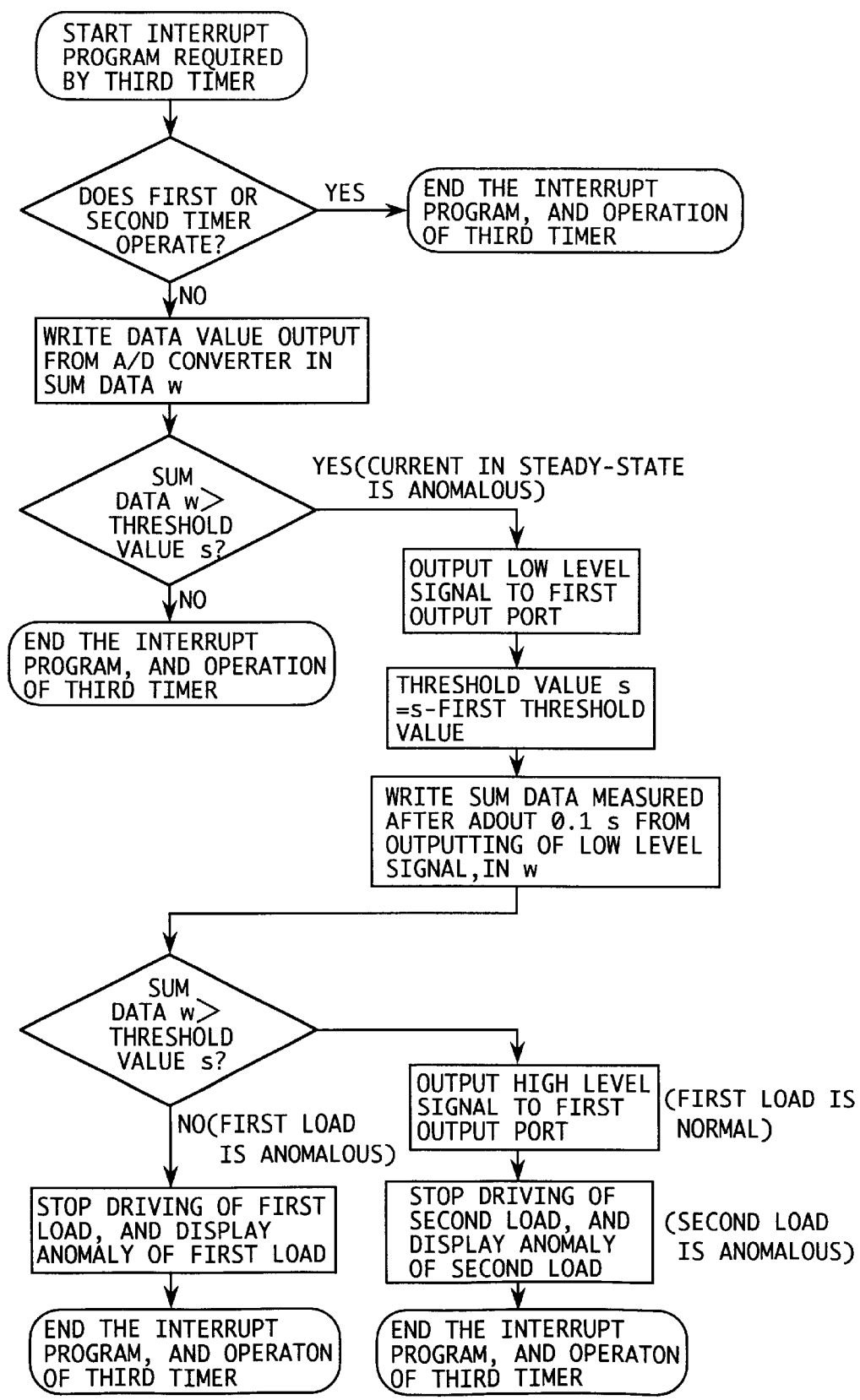
FIG. 23 is another flow chart of a program executed by the central processing unit shown in FIG. 18 and FIG. 21.

FIG. 22 and FIG. 23 show examples of flow charts of programs executed by the central processing unit 94a. In a preparation process, variables s (s1 and s2) in which the threshold values are stored by an initial setting part, and a variable w in which the sum of the respective load current flows is stored. First, it is assumed that the number of the loads is two, and the load current flows change as shown in FIG. 19 and FIG. 20. Further, the first and second timers count the transient periods 148 and 149 of the large starting current flows in the first and second loads 3a and 3b, respectively. Furthermore, the third timer counts the time monitoring interval 160 with which the sum (total current) of the load current flows in the steady state is sampled. At each sampling point, the sampled data of the total current is compared with the second threshold value, and if the sampled data is larger than the second threshold value, it is determined that an anomaly occurs in the first or second load. Consequently, a test of an power-feed interruption for a very short time is also performed for each load. The time for the power-feed interruption is, for example, about 0.1 s. Although a new timer for counting the short time of 0.1 s can be added to this apparatus, a method of counting the short time is not mentioned in this explanation for simplicity of the explanation. In this test, first, power-feed to the first load 3a is interrupted by turning off the MOS-FET 2, and the detected current is compared with a predetermined threshold value. This threshold value is the threshold value for the steady current of the second load 3b. If the current indicates an anomalous value yet, it is determined that the tentatively disconnected load (that is, the first load 3a) is not anomalous, and power is again fed to the first load 3a by turning on the MOS-FET 2. Next, power-feed to the second load 3b is interrupted by turning off the MOS-FET 3b. If the current indicates a normal value converse to the above test, it is determined that the tentatively disconnected first load 3a is anomalous. Thus, power-feed to the first load 3a is interrupted, and an occurrence of an anomaly concerning the first load 3a is displayed. Various counter-measures may be possible to the detected anomaly of the first load 3a. However, it is generally carried out that the driving of the first load 3a is stopped, and it is further signalled to a user by displaying that an anomaly has occurred in the first load 3a, and a repair of a circuit exclusive for the load 3a or the load 3a itself is necessary.

Figure 24:
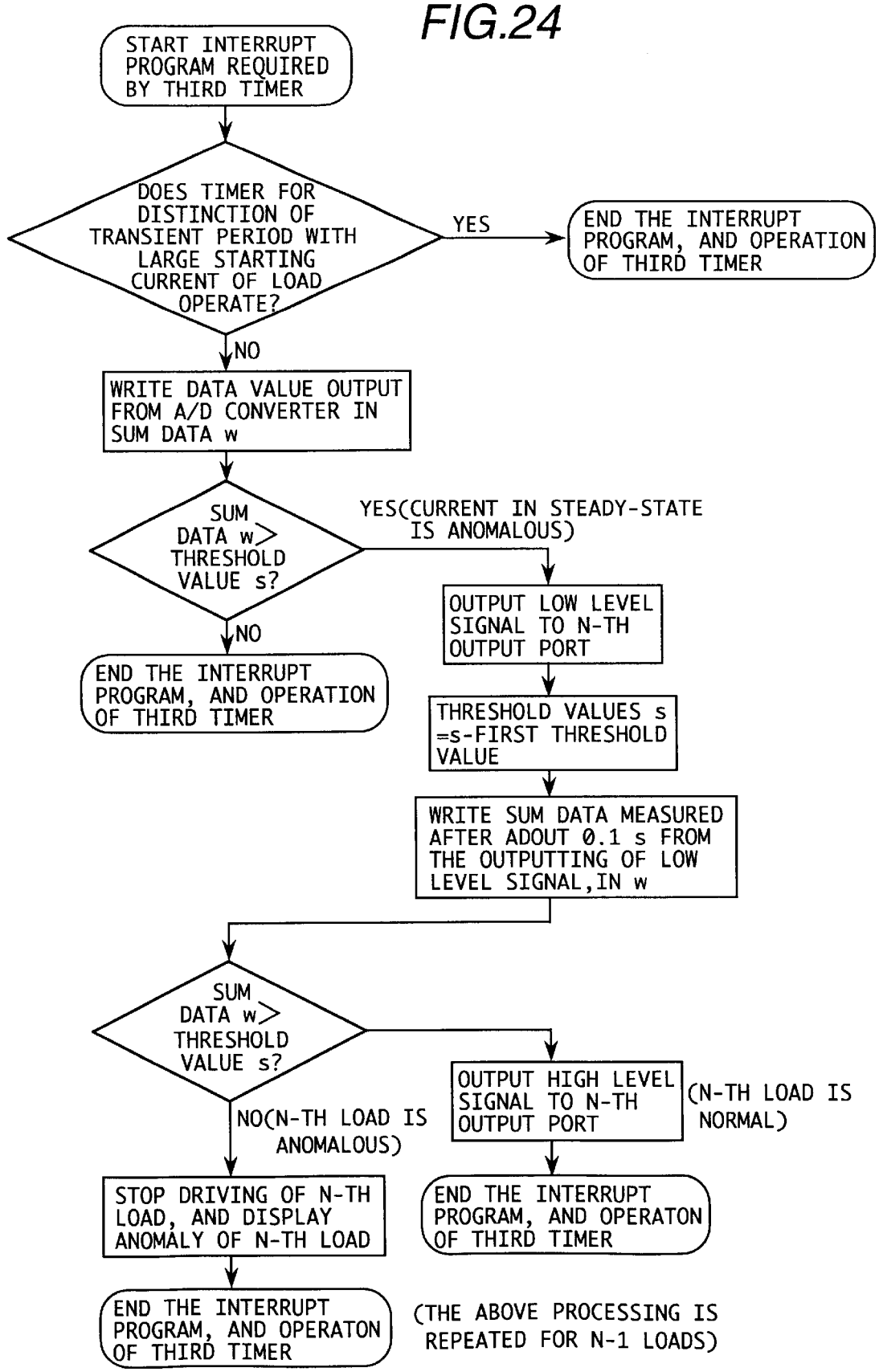
FIG. 24 is another flow chart of a program executed by the central processing unit shown in FIG. 18 and FIG. 21.

When the above-described processing is generalized for N pieces of loads, processing of interrupt programs triggered from the third timer is shown in FIG. 24. The above test for performing a tentative power-feed interruption for a very short time and comparing the detected current with a corresponding threshold value for each load to be tested is repeated for the N pieces of loads in turn. This threshold value is obtained by subtracting a threshold value corresponding to the tested load from the sum of the threshold values for the total load current.

Figure 25:
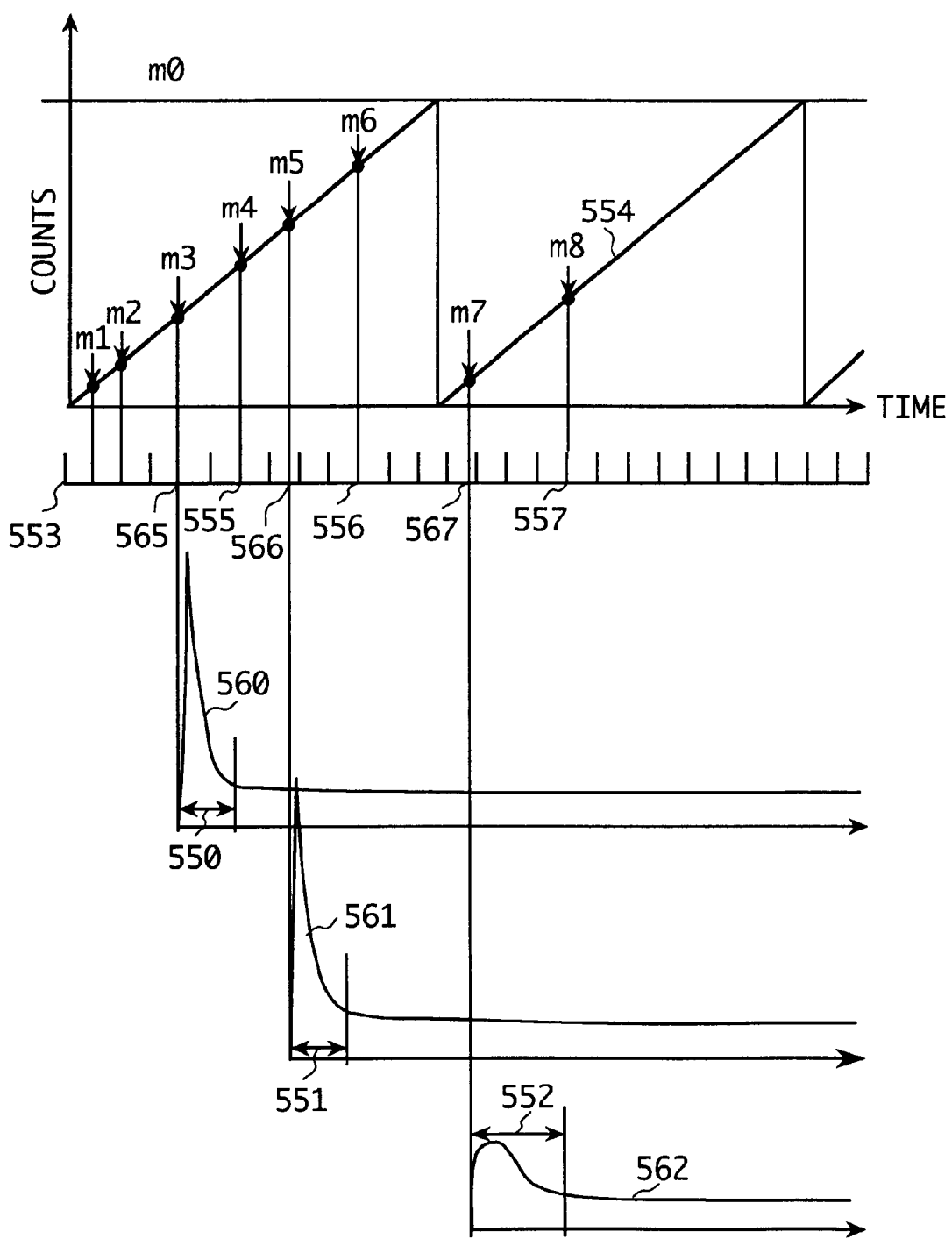
FIG. 25 shows graphs to explain the algorithm realizing the processing shown in FIGS. 22, 23, and 24.

Since each transient period in which a large starting current flows in each load should be considered if a plurality of loads are controlled by the power-feed control apparatus, N transient periods need to be counted by one timer. The above method of counting the N transient periods with one timer is briefly explained with reference to FIG. 25. FIG. 25 shows changes of counts executed by a free-running counter provided in the microprocessor 80 or 80a, which is indicated by the graph 554. Numeral 153, numerals 555–557 and 565–567, and numerals 550–552 indicate timing points which are repeatedly generated by one timer to trigger an interrupt task, points in time, and time intervals, respectively. Further, numerals 160–162 indicate changes of current fed to the loads. Moreover, marks m0, and m1–m8 indicate the maximum count value set to the free-running counter, and counts counted by the free-running counter. The free-running counter repeatedly counts the count value from 0 to m0. Here, it is assumed that the values m1, m2, and m3 are counts at the load starting points 565, 566, and 567. Further, count-numbers 11, 12 and 13 are set to the free-running counter for the time intervals 550, 551, and 552, respectively. Meanwhile, if counts obtained at the timing points which are generated by the timer to trigger an interrupt task are mi1, mi2, and mi3, the conditions indicating that the respective large starting current periods have elapsed are mi1−m1>11, mi2−m2>12, and mi3−m3>13, respectively. In FIG. 25, since m4−m1>11, m6−m2>12, and m8−m3>13, it is confirmed that the respective large starting current periods have elapsed at the points in time 555, 556, and 557. Besides the above method to count the difference between the present counts and the counts at each load starting, a method to count the number of triggers executed by the timer is applicable. For example, since the counts counted between the neighboring trigger points which are generated by the timer to trigger an interrupt task is constant (for example, m2−m1=10), in order to confirm that counts have elapsed the preset count-number 11, 12, or 13, it is checked whether or not the number of trigger points exceed the ratios h1=11/10, h2=12/10, or h3=13/10. Concretely speaking, each of newly provided counter variables j1, j2, and j3 to store the number of triggers is cleared at a corresponding point of the points in time 565, 566, and 567, and if the conditions j1≧h1, j2≧h2, or j3≧h3 is satisfied, it can be determined that the present counts attains or exceeds each of the points 555, 556, and 555.

Figure 26:
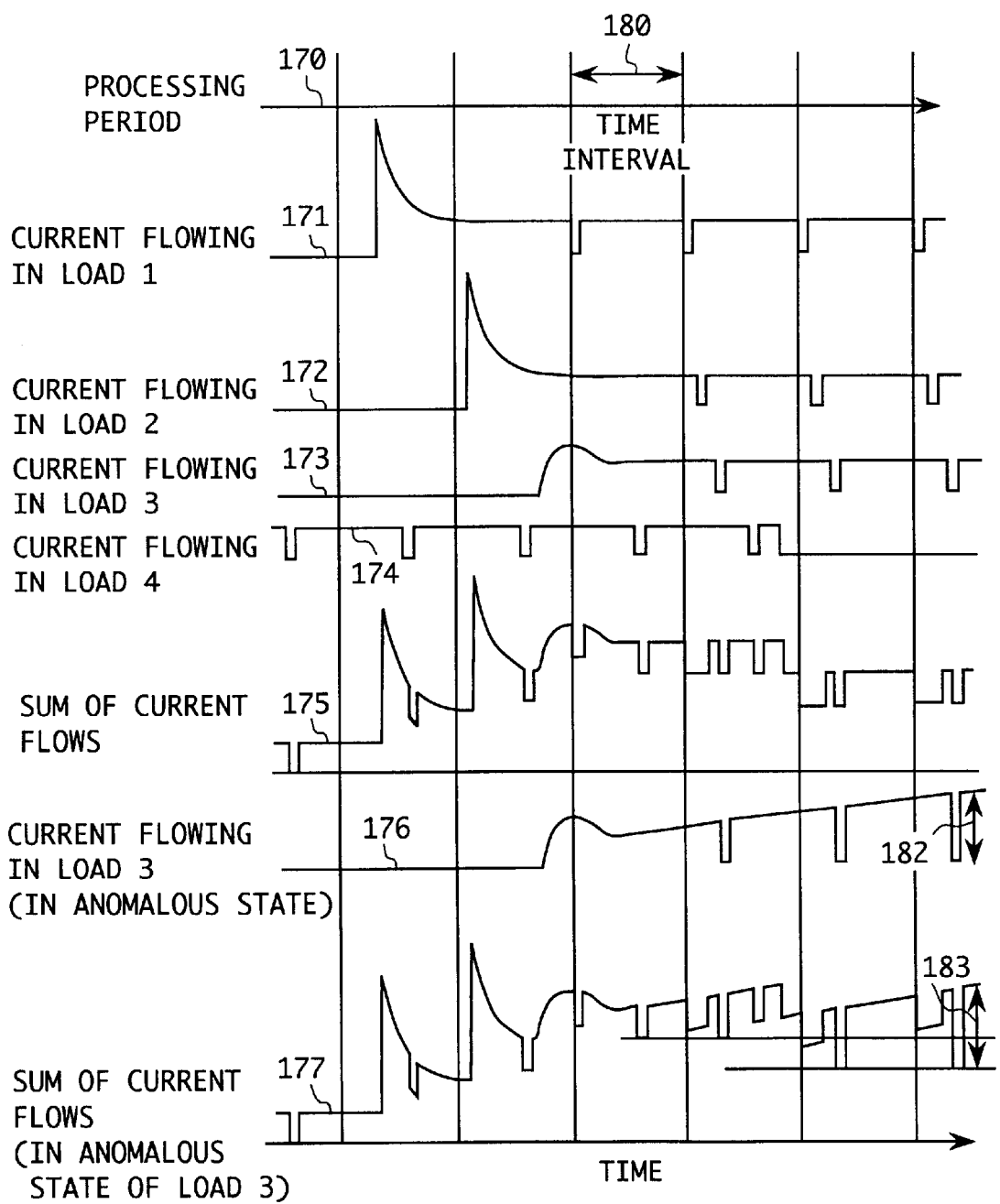
FIG. 26 is graphs to explain other processing for detecting an anomaly in a plurality of power elements.

In the above explanation, the identification of an anomalous load is automatically performed by interrupting power-feed to each load in turn only when an anomaly is detected. On the other hand, FIG. 26 shows operations of another embodiment in which a plurality of loads is always and periodically tested in turn by interrupting power-feed to each load for a short time and feeding power to the load again in a time sharing manner. In FIG. 26, numerals 170–177 indicate changes of current flows in the respective loads, and numeral 180 indicates a time interval. Further, numerals 182 and 183 indicate changes of the current flows in the loads in the above-mentioned test. In this example, four loads are periodically tested by performing the power-ON/OFF operation for each load in a time sharing manner. That is, after the current flows in all the loads have become steady, changes of the total load flow are periodically detected by performing power-OFF to each load for a very short time (about 0.1 s) such that a user cannot notice the power-OFF of the load, and if the current change in the power-ON/OFF operation exceeds a predetermined value, it is determined that the load is anomalous. The current flows 171–174 shows examples of normal changes of the respective current flows. In the power-OFF of each load, a current flow of the load becomes zero, and the zero level continues for the time interval of 0.1 s with the period 180. Since the contribution of each load to the change of the total load current cannot be distinguished if the interruptions of power-feed to all the load are simultaneously performed, the interruption of power-feed to each is slightly shifted in the order within the period 180. In this case, since the values of the steady levels in the current flows in the four loads are assumed to be almost the same, it is seen that the changes of the total load current 175 at the power-OFF operations are constantly almost equal. Next, if the current flow in the load 3 does not become steady and gradually increases as shown by the graph 176, the change 182 of the current flow in the load 3 at the power-OFF operation is also detected as the change 183 of the total current 177. A flow chart of the above algorithm is shown in FIG. 27, and is explained below.

Figure 27:
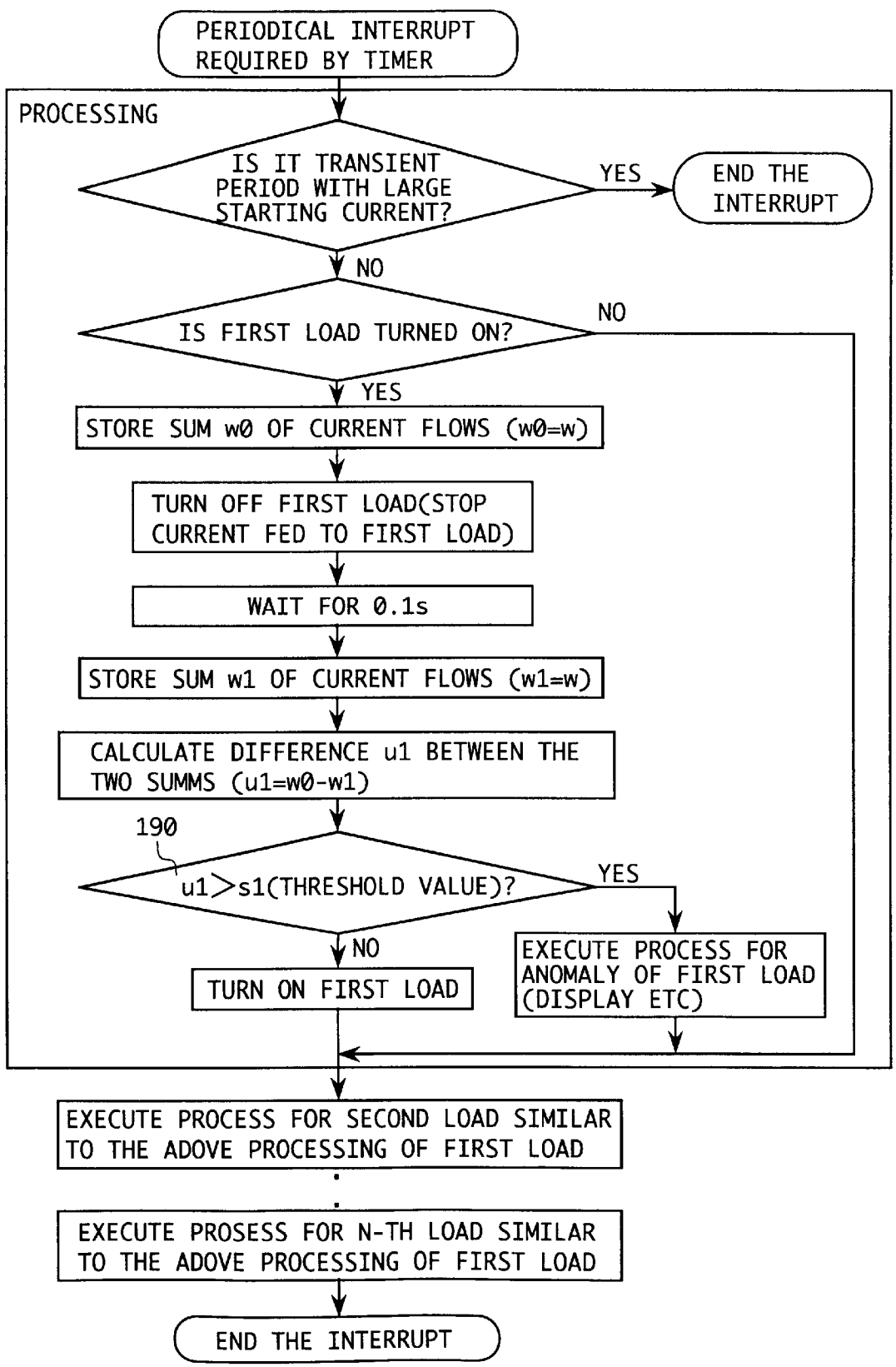
FIG. 27 is a flow chart showing the processing shown in FIG. 26.

In FIG. 27, step 190 indicates a jump depending on the result in the above anomaly detection. A program in the main routine operates the timer for periodically counting the time interval 180, and if the interrupt requirement is generated from by the timer, the control of processing is returned to the main routine. In the main routine, it is first determined whether or not all the loads are in the state of the large starting current (although it is sufficient to determine whether or not only the first loads is in the state of the large starting current when the first load is checked for the transient condition, it is more desirable to confirm that any load is not in the state of the large starting current). Next, the calculated sum data (referred to as the sum current data) w of the current flows in all the loads is stored in a variable w0. Further, a power-OFF operation is performed to the first load, and is continued for 0.1 s. After the time of 0.1 has elapsed, the new sum current data w is stored in a variable w1, and the difference u1 (=w0−w1). Furthermore, it is checked whether or not u1 is larger than a predetermined threshold value s1, and if the result of the determination is "yes", and it is determined that the sum current data in the steady state is anomaly. Successively, similar processing is performed for each of the loads 2–N in turn. As explained above, according to the present invention, an anomalously large value of the sum current in the steady state can be detected. In addition, an anomalously small value of the sum current in the steady state, which is, for example, due to an open-circuit in a load, can be also detected. For this anomaly detection, the condition in the jump is set as follows. That is, the condition is set as "u1>s1 (anomalously large value) or u1<ss1 (anomalously small value)", and ss1 is set at the value of a half of the steady current level. The above anomalously large current is caused by a rare short-circuit state in a circuit due to an intrusion of an extraneous part, degradation of an element in a circuit, or locking of a motor, and the above anomalously small current is caused by an open-circuit in wires in a load, a breakdown of an element in a load, or an insufficient contact in a connection part.

Figure 28:
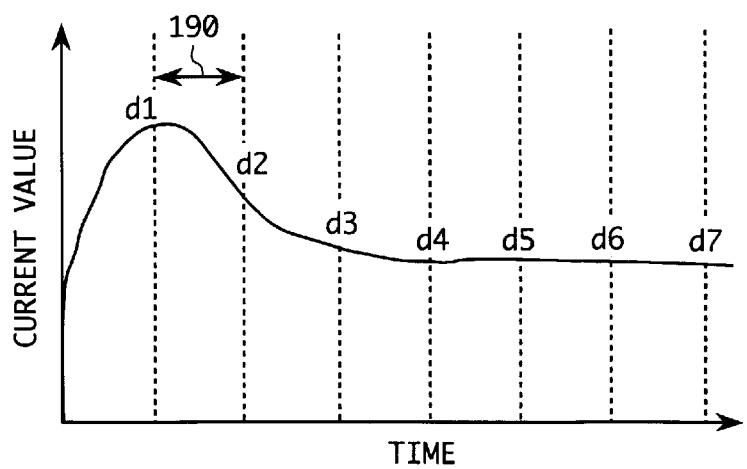
FIG. 28 is an illustration to explain a method of automatically obtaining a level of steady current flowing in a power element.

In the above embodiments, the end of the large starting current period is recognized by using time counts counted by the timer. Further, it is assumed that after the counted time has reached the preset time interval corresponding to the starting transient period, the current becomes steady, and the steady current can be detected. A method of determining the end of the large starting current period and the convergence of the current to the steady value is explained below. That is, in this method, by detecting a serene state in which the variation of the current stays within a predetermined range, it is determined that the current has become steady. FIG. 28 is a graph used to explain this method. In this figure, symbols d1–d7 indicate values of the sampled current, and numeral 190 indicates a sampling time interval. The values of the current sampled with the time interval 190 are stored, and the difference between the present value and the previous value is periodically examined. That is, the differences |d2−d1|, |d3−d2|, |d4−d3|, |d5−d4|, |d6−d5|, and so on are successively monitored, and if these differences continue to stay within a predetermined level, it is determined that the current has become steady.

When the present invention is applied to a vehicle, the over-current protection function of the present invention is not necessarily provided for all of the loads or MOS-FETs for turning on/off the loads. That is, the over-current protection can be, of course, used for only some loads which especially need the protection function, such as motors in which comparatively frequent locking may occur, lamps which consume a large quantity of power, etc.

Furthermore, each means provided in the embodiments according to the present invention can be designed with a hardware circuit, or a software program to be executed in a high-performance calculation device such as a microcomputer.

In accordance with the power-feed control apparatus for a vehicle, in which power elements are used as switching elements, of the present invention, while the usual large starting current is permitted, the over-current or excessive-temperature in a circuit including a load can be effectively prevented by monitoring changes of the load current in the steady state.

What is claimed is:

1. A power-feed control apparatus for a vehicle in which electrical loads are arranged in said vehicle, said power-feed control apparatus comprising:

a power source provided in a vehicle;

at least one power semiconductor element, said power semiconductor element controlling power-feed to one of said electrical loads;

a control means for controlling said power semiconductor element;

an anomaly detection circuit for monitoring operations of said power semiconductor element and determining whether or not an anomaly is occurring in a circuit including said power semiconductor element and said electrical load; and a switching circuit for switching a threshold level between a level for an anomaly detection in a starting current period of said load and that in a steady state of current flowing in said load connected to said power semiconductor element.

2. A power-feed control apparatus according to claim 1, wherein said anomaly detection circuit monitors current flowing in said at least one power semiconductor element, and includes a current detection part, a comparison and determination part, and a time measurement part, said comparison and determination part controlling said switching circuit switching said threshold level based on an elapsed time measured by said time measuring part, which has elapsed from the start time point of said at least one power semiconductor element.

3. A power-feed control apparatus according to claim 1, wherein said anomaly detection circuit includes a heat generating part to generate heat corresponding to the quantity of current flowing in said power semiconductor element, a temperature detection part to detect said generated heat, a comparison and determination part, and a time measurement part, said comparison and determination part switching said threshold level based on an elapsed time, measured by said time measuring part, which has elapsed from the start point of said power semiconductor element.

4. A power-feed control apparatus comprising:

a plurality of control units distributed and arranged in a vehicle;

an electrical load, and at least one of a switch and a sensor connected to an input/output circuit provided in each control unit;

a power semiconductor element in each control unit serially connected to said electrical load, which is turned on/off by a control signal from said each control unit, to feed or interrupt power to said electrical load;

a signal line to which said plurality of control units are connected, information from said at least one of a switch and a sensor connected to one of said plurality of control units being transmitted to another control unit via said signal line;

a timer circuit in each of said control units to start time-counting triggered by a signal sent from said at least one of a switch and a sensor;

an anomaly detection circuit in each control unit for determining an anomaly occurrence in a circuit including said power semiconductor element, a drive circuit for said power semiconductor element, and said electrical load by detecting at least one of current flowing in said power semiconductor element and temperature of said element, said anomaly detection circuit using different anomaly detection levels for a transient state during a starting period and for a steady state; and a detection circuit for determining whether or not current flowing in said power semiconductor element is in said transient state during said starting period.

5. A power-feed control apparatus provided in a vehicle in which power is fed to electrical loads from a battery, said power-feed control apparatus comprising:

at least one power element for controlling ON/OFF operations of said power-feed to one of said electrical loads;

switch signal outputting means provided in said vehicle;

control means for turning on/off said power element in respond to a signal output from said switch signal outputting means or a signal obtained from the output of a decoder which decodes an encoded signal transmitted from said switch signal outputting means via a transmission line;

current detection means for detecting current flowing in said power element;

current/voltage converting means for converting the quantity of said detected current to a voltage signal;

signal converting means for converting said voltage signal output from current/voltage converting means to a digital signal;

threshold value outputting means for outputting a first threshold value and a second threshold value, respectively;

time measuring means for starting to count elapsing time, which is triggered by a signal for first turning on said power element, and for outputting a first time signal to indicate continuation of the counting of the elapsed time and a second time signal to indicate that a predetermined time has elapsed; and threshold value switching means for selecting one of two signals output from said threshold value outputting means, and outputting said selected threshold value.

6. A power-feed control apparatus provided in a vehicle in which power is fed to electrical loads from a battery, said power-feed control apparatus comprising:

at least one power element for controlling ON/Off operations of said power-feed to one of said electrical loads;

switch signal outputting means provided in said vehicle;

control means for turning on/off said power element in respond to a signal output from said switch signal outputting means or a signal obtained from a decoder which decodes an encoded signal transmitted from said switch signal outputting means via a transmission line;

first and second current detection means for detecting current flowing in said power element;

first and second current/voltage converting means for converting the quantities of said current detected by said first and second current detection means to voltage signals, respectively;

power-feed interruption means for turning off said power element based on a control signal output from said control means;

automatic interruption controlling means for automatically starting said power-feed interruption means to turn off said power element if a voltage signal output from said first current/voltage converting means exceeds a predetermined level;

threshold value outputting means for outputting a threshold value;

signal converting means for converting said voltage signal output from said second current/voltage converting means to a digital signal;

time measuring means for starting to count elapsed time, which is triggered by a control signal for first turning on said power element, and for outputting a time signal to indicate continuation of said counting of said elapsed time and another signal to indicated that a predetermined time has elapsed; and current monitoring means for comprising a value of said digital signal output from said signal converting means with said threshold value output from said threshold value outputting means, which is triggered by said another signal to indicate that said predetermined time has elapsed, and for outputting a control signal to start said power-feed interruption means to turn off said power element based on a result of said comparing.

7. A power-feed control apparatus provided in a vehicle in which power is fed to electrical loads from a battery, said power-feed control apparatus comprising:

at least one power element for controlling ON/Off operations of said power-feed to one of said electrical loads;

current detection means for detecting current flowing in said power element;

current/voltage converting means for converting the quantity of said detected current to a voltage signal;

a microprocessor to switch an operation mode between an initial setting mode and a usual operation mode;

switch signal outputting means provided in said vehicle;

control means for turning on/off said power element in respond to a signal output from said switch signal outputting means or a signal obtained from a decoder which decodes an encoded signal transmitted from said switch signal outputting means via a transmission line;

signal converting means for converting said voltage signal output from said current/voltage converting means to a digital signal;

time measuring means for starting to count elapsed time, which is triggered by a signal for first turning on said power element, and for outputting a first time signal to indicate continuation of said counting of said elapsed time and a second time signal to indicate that a predetermined time has elapsed; and steady-state data storing means for storing digital signals output from said signal converting means as steady-state data of current flowing through said power element to said load in respond to said second time signal to indicate that a predetermined time has elapsed and another signal to indicate that an operation mode has been switched to said usual operation mode;

threshold value calculating means for calculating a threshold value based on said stored steady-state data; and current monitoring means for comparing a value of a present digital signal output from said signal converting means with said calculated threshold value output from said threshold value calculating means, and for outputting a control signal to start said power-feed interruption means for turning off said power element based on a result of said comparing.

8. A power-feed control apparatus provided in a vehicle in which power is fed to electrical loads from a battery, said power-feed control apparatus comprising:

at least one power element for controlling ON/Off operations of said power-feed to one of said electrical loads;

switch signal outputting means provided in said vehicle;

control means for turning on/off said power element in respond to a signal output from said switch signal outputting means or a signal obtained from a decoder which decodes an encoded signal transmitted from said switch signal outputting means via a transmission line;

temperature detection means for detecting temperature of said power element;

temperature/voltage converting means for converting said detected temperature to a voltage signal;

signal converting means for converting said voltage signal output from said temperature/voltage converting means to a digital signal;

power-feed interruption means for turning off said power element in respond to a control signal output from said control means;

automatic interruption controlling means for automatically starting said power-feed interruption means to turn off said power element if a voltage signal output from said temperature/voltage converting means exceeds a predetermined level;

threshold value outputting means for outputting a threshold value;

current detection means for detecting current flowing in said power element;

current/voltage converting means for converting said detected current to a voltage signal;

signal converting means for converting said voltage signal output from said current/voltage converting means to a digital signal;

time measuring means for starting to count elapsed time by a signal for first turning on said power element, and outputting a first time signal for indicating continuation of the counting of the elapsed time and a second time signal for indicating that a predetermined time has elapsed; and current monitoring means for comparing a value of a present digital signal output from said signal converting means and said threshold value output from said threshold value outputting means, and for outputting a control signal for starting said power-feed interruption means to turn off said power element based on a result of said comparing.

9. A power-feed control apparatus provided in a vehicle in which power is fed to electrical loads from a battery, said power-feed control apparatus comprising:

at least one power element for controlling ON/Off operations of said power-feed to one of said electrical loads;

switch signal outputting means provided in said vehicle;

control means for turning on/off said power element in respond to a signal output from said switch signal outputting means or a signal obtained from a decoder which decodes an encoded signal transmitted from said switch signal outputting means via a transmission line;

first and second temperature detection means for detecting temperature of said power element;

first and second temperature/voltage converting means for converting the quantities of said temperature detected by said first and second temperature detection means to voltage signals, respectively;

power-feed interruption means for turning off said power element based on a control signal output from said control means;

automatic interruption controlling means for automatically starting said power-feed interruption means to turn off said power element if a voltage signal output from said first temperature/voltage converting means exceeds a predetermined level;

threshold value outputting means for outputting a threshold value;

signal converting means for converting said voltage signal output from said second temperature/voltage converting means to a digital signal;

time measuring means for starting to count elapsed time, which is by a control signal for first turning on said power element, and for outputting a first time signal to indicate continuation of said counting of said elapsed time and a second time signal to indicate that a predetermined time has elapsed; and current monitoring means for comparing a value of said digital signal output form said signal converting means with said threshold value output from said threshold value outputting means, which is triggered by said signal that said predetermined time has elapsed, and for outputting a control signal to start said power-feed interruption means to turn off said power element based on a result of said comparing.

10. A power-feed control apparatus according to claim 8, wherein said power element is a power MOS-FET, and each of said current detection means, said temperature detection means, said first and second current detection means, and said temperature detection means is composed of MOS-FETs whose gate voltage is equal to that of said power MOS-FET, a value of drain current flowing in each of said MOS-FETs being proportional to that flowing in said power MOS-FET.

11. A power-feed control apparatus according to claim 8, wherein said power element is a power bipolar transistor, and each of said current detection means, said temperature detection means, said first and second current detection means, and said temperature detection means is composed of bipolar transistors whose base voltage is equal to that of said power bipolar transistor, a value of collector current flowing in each of said bipolar transistors being proportional to that flowing in said power bipolar transistor.

12. A power-feed control apparatus provided in a vehicle in which power is fed to electrical loads from a battery, said power-feed control apparatus comprising:

at least one power element for controlling ON/Off operations of said power-feed to one of said electrical loads;

switch signal outputting means provided in said vehicle;

a microprocessor for turning on/off said power element in respond to a signal output from said switch signal outputting means or a signal obtained from a decoder which decodes an encoded signal transmitted from said switch signal outputting means via a transmission line;

first and second current detection means for detecting current flowing said power element;

first and second current/voltage converting means for converting the quantities of said current detected by said first and second current detection means to voltage signals, respectively;

power-feed interruption means for turning off said power element;

automatic interruption controlling means for automatically starting said power-feed interruption means to turn off said power element if a voltage signal output from said first current/voltage converting means exceeds a predetermined level; and signal converting means for converting said voltage signal output from said second current/voltage converting means to a digital signal;

wherein said microprocessor includes a timer circuit for counting a predetermined time interval, data storing means for storing a threshold value, and a central processing unit which outputs a control signal to said power-feed interruption means to send a voltage signal for turning on said power element when said power-feed interruption means is in a state of passing a current flow, sends a trigger signal for starting said counting of said counting of said predetermined time interval to said timer circuit simultaneous with said outputting of said control signal, compares a value of a present signal output from said signal converting means with said threshold value output from said data storing means after said counting of said predetermined time interval has been completed, and outputs another control signal to said power-feed interruption means to send a voltage signal for turning off said power element if said value of said present signal is larger than said threshold value.

13. A power-feed control apparatus provided in a vehicle in which power is fed to electrical loads from a battery, said power-feed control apparatus comprising:

N power elements for controlling ON/Off operations of power-feed to N loads of said electrical loads, where N is not less than 2;

switch signal outputting means provided in said vehicle;

at least one microprocessor to turn on/off said N power elements in respond to signals output from said switch signal outputting means or signals obtained from a decoder which decodes each encoded signal transmitted from said switch signals outputting means via a transmission line;

N power-feed interruption means, each power-feed interruption means turning off a corresponding power element in respond to a control signal output from said at least one microprocessor;

a first group of N current detection means, each current detection means detecting current flowing in each of said N power elements;

N automatic interruption controlling means, each of said N automatic interruption controlling means automatically starting a corresponding power-feed interruption means of said N power-feed interruption means is a value of a signal output from a corresponding current detection means of said first group of said N current detection means of said first group of said N current detection means exceeds a predetermined value;

a second group of M current detection means for detection current flowing in a M power elements of said N power elements, where M is not more than N;

current/voltage converting means for summing values signals output from said second group of said M current detection means, and for converting said sum to a voltage signal;

signal converting means for converting said voltage signal of said sum to a digital signal; and a central processing unit in said at least one microprocessor which tentatively outputs a control signal to turn off each one of J power elements (J≦M) in an ON state for a short time interval in turn such that each short time interval does not overlaps other short time intervals, calculates a value change between two digital signals output from said signal converting means before and after said tentative turning-off of each of said J power elements, and turns off one of said J power element if said value change in said one exceeds a predetermined value.

14. A power-feed control apparatus provided in a vehicle in which power is fed to electrical loads from a battery, said power-feed control apparatus comprising:

N power elements for controlling ON/Off operations of power-feed to N loads of said electrical loads, where N is not less than 2;

switch signal outputting means provided in said vehicle;

at least one microprocessor to turn on/off said power elements in respond to signals output from said switch signal outputting means or signals obtained from a decoder which decodes each encoded signal transmitted from said switch signals outputting means via a transmission line;

N power-feed interruption means, each power-feed interruption means turning off a corresponding power element in respond to a control signal output from said microprocessor;

a first group of N current detection means, each current detection means detecting current flowing in each of said N power elements;

N automatic interruption controlling means, each of said N automatic interruption controlling means automatically starting a corresponding power-feed interruption means of said N power-feed interruption means if a value of a signal output from a corresponding current detection means exceeds a predetermined value;

a second group of M current detection means for detecting current flowing in M power elements of said N power elements, where M is not more than N;

current/voltage converting means for summing values signals output from said second group of said M current detection means, and for converting said sum to a voltage signal; and signal converting means for converting said voltage signal of said sum to a digital signal;

wherein said microprocessor includes a timer circuit for periodically counting a period T and outputting a trigger signal at the end of each period T, and a central processing unit which periodically outputs a series of control signals, with said period T in respond to each trigger signal, to turn off each of J power elements (J≦M) in an ON state for a short time interval in turn such that each short time interval does not overlaps other short time intervals, calculates a value change between digital signals output from said signal converting means before and after tentative turning-off of each of said J power elements, and turns off one of said J power element if said value change in said one exceeds a predetermined value.

15. A power-feed control apparatus according to claim 13, further including power-feed interruption stopping means for stopping said interruption of power-feed to each of said J power elements for a predetermined time after each of said J power elements has been initially turned on.

* * * * *